US012036792B2

(12) United States Patent
Galliker

(10) Patent No.: US 12,036,792 B2
(45) Date of Patent: Jul. 16, 2024

(54) ELECTROHYDRODYNAMIC PRINT HEAD WITH STRUCTURED FEED LAYER

(71) Applicant: Scrona AG, Adliswil (CH)

(72) Inventor: Patrick Galliker, Richterswil (CH)

(73) Assignee: Scrona AG, Adliswil (CH)

( * ) Notice: Subject to any disclaimer, the term of this patent is extended or adjusted under 35 U.S.C. 154(b) by 268 days.

(21) Appl. No.: 17/627,292

(22) PCT Filed: Jul. 17, 2019

(86) PCT No.: PCT/EP2019/069213
§ 371 (c)(1),
(2) Date: Jan. 14, 2022

(87) PCT Pub. No.: WO2021/008699
PCT Pub. Date: Jan. 21, 2021

(65) Prior Publication Data

US 2022/0242116 A1 Aug. 4, 2022

(51) Int. Cl.
*B41J 2/16* (2006.01)
*B41J 2/06* (2006.01)

(52) U.S. Cl.
CPC ................. *B41J 2/06* (2013.01); *B41J 2/162* (2013.01); *B41J 2/1626* (2013.01); *B41J 2002/061* (2013.01); *B41J 2202/22* (2013.01)

(58) Field of Classification Search
CPC ........................................................ B41J 2/04
See application file for complete search history.

(56) References Cited

U.S. PATENT DOCUMENTS

| | | | | |
|---|---|---|---|---|
| 4,658,269 | A * | 4/1987 | Rezanka | B41J 2/085 205/75 |
| 6,312,110 | B1 | 11/2001 | Darty | |
| 6,341,851 | B1 | 1/2002 | Takayama et al. | |
| 2006/0033773 | A1 | 2/2006 | Owaki | |
| 2016/0279939 | A1 * | 9/2016 | Arae | B41J 2/06 |
| 2016/0288498 | A1 | 10/2016 | Hayashi | |
| 2018/0009223 | A1 * | 1/2018 | Poulikakos | B41J 2/1433 |

(Continued)

FOREIGN PATENT DOCUMENTS

| | | |
|---|---|---|
| EP | 0 911 164 | 4/1999 |
| EP | 1 199 173 | 4/2002 |

(Continued)

OTHER PUBLICATIONS

Int'l Search Report (Form PCT/ISA/210) conducted in Int'l Application No. PCT/EP2019/069213 (Apr. 28, 2020).

(Continued)

*Primary Examiner* — Scott A Richmond
(74) *Attorney, Agent, or Firm* — GREENBLUM & BERNSTEIN, P.L.C.

(57) ABSTRACT

The electrohydrodynamic print head includes a nozzle layer with a plurality of nozzles. A feed layer is arranged above nozzle layer. It contains feed ducts for feeding ink to the nozzles as well as electrically conducting feed lines for feeding voltages to electrodes at nozzles. The feed layer includes one or more dielectric sublayers, which is/are structured to form the feed ducts and feed lines. Some of the sublayers contain vertical via sections and others contain horizontal interconnect sections. The feed layer is structured for customizing the print head easily.

30 Claims, 13 Drawing Sheets

(56) References Cited

U.S. PATENT DOCUMENTS

| | | | | |
|---|---|---|---|---|
| 2018/0117911 | A1* | 5/2018 | Hayashi | B41J 2/1433 |
| 2019/0322103 | A1* | 10/2019 | Perez | B41J 2/14 |
| 2019/0389212 | A1 | 12/2019 | Hayashi | |

FOREIGN PATENT DOCUMENTS

| | | |
|---|---|---|
| EP | 3 075 537 | 10/2016 |
| JP | 2006-297754 | 11/2006 |
| JP | 2015-147425 | 8/2015 |
| WO | 2012/040765 | 4/2012 |
| WO | 2016/169956 | 10/2016 |

OTHER PUBLICATIONS

Int'l Written Opinion (Form PCT/ISA/237) conducted in Int'l Application No. PCT/EP2019/069213 (Apr. 28, 2020).

* cited by examiner

ELECTROHYDRODYNAMIC PRINT HEAD WITH STRUCTURED FEED LAYER

TECHNICAL FIELD

The invention relates to an electrohydrodynamic print head. This is a print head where electrical fields are used to accelerate the ink from nozzles onto a target to be printed on. The invention also relates to a method for manufacturing such a print head.

BACKGROUND ART

US 2018/0009223 describes an electrohydrodynamic print head having a nozzle layer comprising a plurality of nozzles. It is based on a silicon structure where the nozzles are arranged on one side and feed ducts extend through a feed layer on the other side.

DISCLOSURE OF THE INVENTION

The problem to be solved by the present invention is to provide a print head and method for manufacturing such a print head with improved design versatility.

This problem is solved by the print head of claim 1.

Accordingly, the invention relates to an electrohydrodynamic print head comprising at least the following elements:

- A nozzle layer: The nozzle layer comprises a plurality of nozzles for ejecting the ink onto the substrate. It further comprises a plurality of nozzle electrodes for the electrohydrodynamic acceleration of ink to be ejected from the nozzles.
- A feed layer: The feed layer comprises a plurality of feed ducts extending through it. The feed ducts connect at least part of the nozzles to one or more ink terminals of the print head. They can be used to feed ink to the nozzles.

According to the invention, the feed layer is, at least in part, of a dielectric material. Using a dielectric material instead of a silicon layer as a feed layer has the potential to improve design flexibility. It provides improved electrical insulation between the ducts and/or between any electrical vias or other conducting lines extending through the feed layer, and it becomes possible to use materials that have mechanical properties that are superior to those of silicon.

Advantageously, only a subset of the nozzles communicate via the feed ducts with the ink terminals. This design is based on the idea that the feed layer is used to define which nozzles are active and which ones are not. Since the feed layer is easier to manufacture and to customize than the more complex nozzle layer, this allows mass-producing a large number of identical nozzle layers and then customizing the print heads using suitably structured feed layers.

Advantageously, only a subset of the nozzles is connected to the feed ducts.

The print head may further comprise at least one voltage terminal, in particular several voltage terminals, at the feed layer for connecting the nozzle electrodes to a voltage supply in order to activate the nozzles. Further, the print head comprises a plurality of electrical tracks arranged in or on said feed layer. These feed lines electrically connect the voltage terminal(s) to at least part of the nozzle electrodes. This allows electrically feeding the nozzles from the feed layer, thereby reducing the design complexity of the nozzle layer.

Advantageously, only a subset of the nozzle electrodes is connected to the voltage terminal(s). This design is based on the idea that the feed layer is used to define which nozzles are active and which ones are not. Since the feed layer is easier to manufacture and to customize than the more complex nozzle layer, this allows mass-producing a large number of identical nozzle layers and then customizing them using suitably structured feed layers. In this embodiment, the print head advantageously comprises a plurality of identical nozzles with identical nozzle electrodes, but only a subset of the nozzle electrodes is connected to the voltage terminal(s).

At least part of these electrically conducting feed lines may comprise electrically conducting vias extending through at least part of the feed layer, and in particular through at least a bottommost sublayer of the feed layer.

To simplify the manufacturing of the nozzle layer, that layer can comprise a two-dimensional, regular array of said nozzles. Any customization of the nozzles can then e.g. be achieved by suitably adapting the feed layer, e.g. by suitably customizing the feed ducts for the ink and/or the feed lines for the electrical signals.

The feed ducts may comprise

- via sections extending transversally, in particular perpendicularly, through at least part of said feed layer and/or
- at least one interconnect section extending along said feed layer.

The interconnect section(s) may interconnect several via sections.

Advantageously, the print head comprises both the via sections and the interconnect sections. In this case, each interconnect section can be connected to several via sections in order to feed the same ink to them.

In another aspect, the invention relates to a method for manufacturing such a print head. The method comprises the steps of

- a) Manufacturing the nozzle layer with the nozzles: This step can e.g. be carried out in a semiconductor foundry.
- b) Manufacturing the feed layer: This step can be carried out separate from step a) or in combination with step a).
- c) Forming the feed ducts in said feed layer.

The orders of these steps is arbitrary as long as step c) is not carried out before at least part of step b). Steps b) and c) may e.g. comprise multiple substeps where sublayers are formed and structured consecutively. The method may comprise further steps before, after, and/or during the above steps, e.g. for forming the electrical feed lines, including filling of vias with electrically conductive material, e.g. by electrodeposition or by printing, including by printing with a print head according to this invention.

In one embodiment, the method may comprise the step of applying or manufacturing the nozzle layer to/on one side of at least part of the feed layer. In the first option ("applying the nozzle layer to one side of the feed layer") the two layers are manufactured separately and then the nozzle layer is applied to the feed layer (at this point, the feed layer may already be complete or it may yet be incomplete, in particular comprise only part of its sublayers). In the second option ("manufacturing the nozzle layer on one side of at least part the feed layer") at least part of the feed layer is manufactured first, whereupon it is used as a substrate for building the nozzle layer thereon.

Further, the method may comprise the step of opening at least part of the feed ducts through the feed layer after applying or manufacturing the nozzle layer. This allows a customization of the print head after joining the layers.

Advantageously, the method comprises the step of forming at least part of the feed ducts in the feed layer by laser-induced etching. This method allows to generate deep ducts in the feed layer and, optionally, to easily customize their locations.

The concept described here combines the nozzle layer with the feed layer. The nozzle layer may be a high-precision device having structures with a horizontal size of 1 μm or less. Such structures are e.g. manufactured in large numbers at a semiconductor foundry. The feed layer, on the other hand, may have only larger structures with horizontal sizes of 10 μm or more, which allows using coarser manufacturing technologies. They may e.g. be customized to the print head to be manufactured.

Customization advantageously takes place in one or more of the uppermost sublayers of the feed layer in order to use the same manufacturing steps for most of the lower sublayers of the feed layer, preferably on a wafer-level, i.e. before dicing the wafer into chips.

As mentioned, the invention is particularly advantageous because it allows to manufacture the nozzle layer and part of the feed layer in large numbers using lithographic techniques. Any customization may take place in the uppermost sublayers of the feed layer.

For example, one may standardize parts of the feed layer that are used to redistribute feed lines carrying the voltage signals of electrodes that are commonly not changed between any two nozzles. For example, the shielding electrode commonly carries the same voltage all across the print head. Hence, the number of feed lines carrying signals to the shielding electrode may be interconnected on one of the sublayers of the feed layer and then progress to upper parts of the feed layer at predefined positions and at a lower density than in the lower feed layers. The density may be chosen such that upon dicing of the wafer into individual print heads, the uppermost sublayer of the feed layer of each print head still contains at least one feed line that contacts to the shielding electrodes.

Similarly, also the number of feed ducts can be reduced in a standardized manner. For example, in many embodiments there is no need for a completely random distribution of inks to different nozzles. Instead, it may be sufficient if a given ink is carried by a full row of nozzles, while a neighboring full row of nozzles carries a different ink. In this way it is possible to interconnect the feed ducts along the mentioned nozzle rows and create only a single feed duct on an upper sublayer of the feed layer. This single feed duct will then supply liquid to all the nozzles contained within the respective row of nozzles.

Of course, this principle is not limited to interconnecting only the feed ducts of all nozzles contained within a single row of nozzles, but instead it may also be applied to any two neighboring or any three neighboring rows of nozzles, or also to all nozzles contained within a given rectangular area, and so forth. However, again, when looking at the whole production wafer, it is useful to form an appreciable density of feed ducts on the uppermost sublayer of the feed layer. Hence, even though a single feed duct may be sufficient to contact to all nozzles contained within the same row of nozzles, this would mean that the wafer cannot be diced into smaller print heads without at least some of the resulting print head dies not having such a feed duct present.

Hence, advantageously, the feed layer comprises at least a first and a second sublayer with via sections, wherein the number of via sections on a lower one of the sublayers is larger than in a higher one of the sublayers. Advantageously, the number is at least twice larger, in particular at least ten times larger.

While the above examples illustrate a way of creating standardized interconnections, the same is generally not possible for the feed lines contacting to extraction electrodes. Extraction electrodes are responsible for causing droplet ejection and, in case two different nozzles are required to eject droplets at different times, it is necessary to provide separate voltage signals to them.

WO 2016/169956 A1 discloses a method for contacting a multitude of nozzles to the same voltage signal. In this way, nozzles may be arranged on the print head according to a common periodicity, and two nozzles sharing the same extraction electrode voltage signal will print the same part of a periodic structure at a different position. With a view on the present invention, the feed lines contacting to extraction electrodes may be funneled to upper sublayers of the feed layer, to a level at which feed lines originating from other electrodes, e.g. the shielding electrode, are already reduced by a maximum amount due to standardized redistribution on lower sublayers. Accordingly, there is more room on such an upper sublayer for the feed lines of extraction electrodes to be redistributed.

In case the redistribution of the feed lines of other electrodes, as well as of feed ducts, takes place on lower layers, in a standardized way, it is possible to perform associated manufacturing tasks on a wafer-level, i.e. before dicing the wafer into individual print head dies.

If print head dies are to be customized, such customization may involve—e.g. as a last step of microfabrication—redistributing the feed lines of the extraction electrodes on the die-level, as well as connecting feed lines associated with other electrodes to the intended position of the voltage terminals.

As mentioned, feed line redistribution can involve interconnecting the feed lines of a multitude of extraction electrodes and connecting them to a voltage terminal of the voltage supply. In this way, more than one nozzle will be ejecting droplets upon activation of a given voltage terminal.

A way of customizing a print head in this way is by defining several area fractions of equal size and shape, with each area fraction comprising the same number and arrangements of nozzles. The nozzle electrodes of all nozzles contained within such single area fraction are connected to separate voltage terminals of the print head, i.e. the nozzles within a surface area are individually addressable to eject ink.

On the other hand, the nozzle electrodes of all nozzles in any given coordinate of all the area fractions are connected to the same voltage terminal. In other words, e.g. all nozzle electrodes at a certain coordinate within their area fraction are connected to the same voltage terminal. When applying a voltage pulse to this voltage terminal, all nozzles at the respective coordinate within their area fraction will eject ink.

With a print head created in this a way, it is possible to individually control each nozzle in any area fraction. However, since different area fractions are interconnected, a digital print layout created with the nozzles of a given area fraction will be reproduced by the nozzles of all other interconnected area fractions as well.

This allows to exploit the known technique of creating a wafer having dies containing the basic information of a single product, wherein such single product is then periodically multiplied throughput the wafers surface. Hence, the size and shape of the area fraction may be chosen according to a regular die size provided by the customer.

The invention also relates to the use of the print head for electrohydrodynamic printing.

BRIEF DESCRIPTION OF THE DRAWINGS

The invention will be better understood and objects other than those set forth above will become apparent when consideration is given to the following detailed description thereof. This description makes reference to the annexed drawings, wherein.

MODES FOR CARRYING OUT THE INVENTION

Definitions

Figure 1:
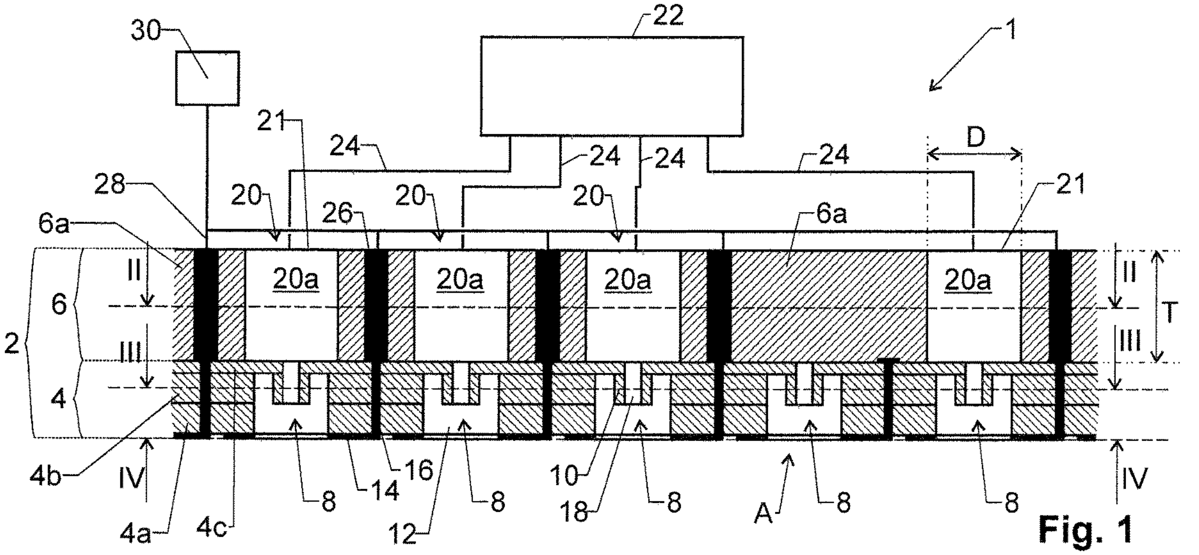
FIG. 1 is a sectional view of a first embodiment of a print head.
Figure 2:
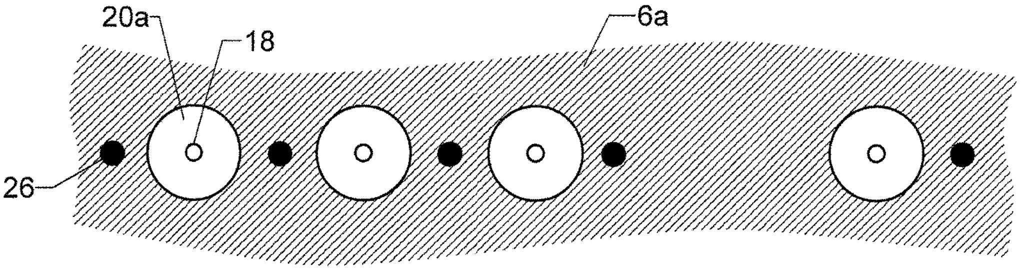
FIG. 2 is a sectional view along line II-II of FIG. 1.
Figure 3:
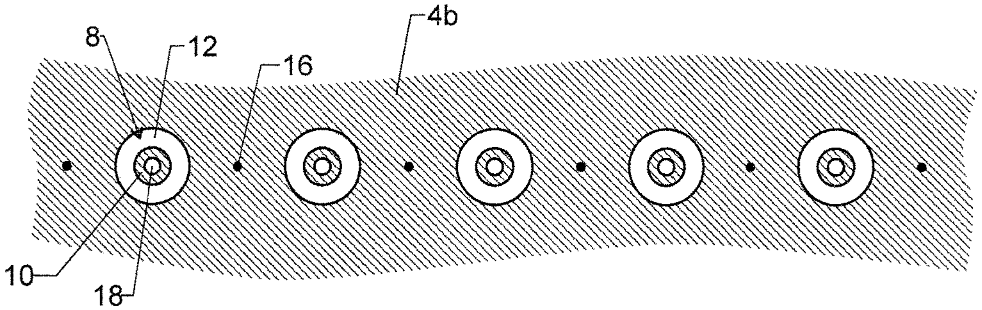
FIG. 3 is a sectional view along line III-III of FIG. 1.
Figure 4:
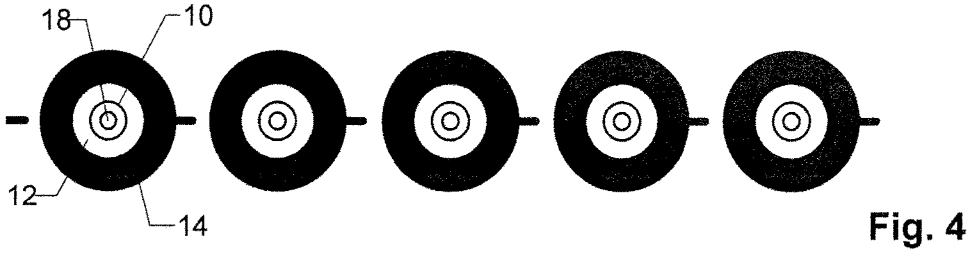
FIG. 4 is a sectional view along line IV-IV of FIG. 1.

A dielectric is a material having an electrical conductivity of $10^{-6}$ S/m or less.

Terms such as above, below, top, bottom are to be understood such that the nozzle layer defines the bottom part of the print head and the feed layer is arranged above the nozzle layer.

Horizontal designates the directions parallel to the planes of the nozzle and feed layers. Vertical designates the direction perpendicular to the planes of the nozzle and feed layers.

Feed ducts are ducts guiding ink through the feed layer. Feed ducts may include via sections that extend transversally, in particular vertically, through one or more sublayers of the feed layer and provide ink transport in vertical direction. Feed ducts may also include interconnect sections that extend horizontally through the print head and provide ink transport in horizontal direction. Typically, interconnect sections interconnect several via sections in a next lower sublayer of the print head.

Feed lines are electrically conductive leads (tracks) guiding electric current through the feed layer. Feed lines may include electrical vias that extend transversally, in particular vertically, through one or more sublayers of the feed layer and provide current (voltage) transport in vertical direction. Feed lines may also include horizontal electrical tracks that extend horizontally through or along the feed layer and provide current (voltage) transport in horizontal direction.

First Embodiment

FIGS. 1-4 show a first embodiment of a print head 1.

It comprises a main body 2 with a plurality of structured layers. In particular, main body 2 comprises a nozzle layer 4 and a feed layer 6, with nozzle layer 4 being arranged, by definition, below feed layer 6.

Nozzle layer 4 forms a plurality of nozzles 8. Each nozzle 8 has a spout 10 arranged in a recess 12 and a nozzle electrode 14. Nozzle electrode 14 is arranged at a lower level than spout 10 in order to electrohydrodynamically extract ink from spout 10 and accelerate it towards a target located below print head 1.

Nozzle electrode 14 is advantageously arranged, at least in part, around a bottom end of recess 12 and may be annular.

Nozzle layer 4 comprises a plurality of sublayers. In the present embodiment, these include:

- A first sublayer **4*a* forming a bottom section of the recesses 12**.
- A second sublayer **4*b* located above first sublayer 4*a* and forming a top section of the recesses 12 as well as the spouts 10**.

A third sublayer 4*c* arranged above second sublayer 4*b* and forming a plate carrying the spouts 10 at the center of their respective recesses 12.

First, second, and third sublayers 4*a*, 4*b*, 4*c* are advantageously dielectric layers, such as layers of silicon dioxide.

From each nozzle electrode 14, an electrically conducting via 16 extends through nozzle layer 4 to feed layer 6.

Each spout 10 forms a channel 18 extending between a bottom-side opening of the spout and feed layer 6.

Nozzle layer 4 may have the same structure at a majority of all nozzles 8 or even at all of them. It may e.g. be mass-produced at a semiconductor foundry using known anisotropic etching and semiconductor patterning technologies.

Feed layer 6 comprises a plurality of feed ducts 20 extending through it for feeding ink to the nozzles 8. In the shown embodiment, each feed duct comprises a via section 20*a* extending perpendicularly through feed layer 6.

Feed ducts 20 connect the nozzles to one or more ink terminals 21 of the print head, which can in turn be connected to one or more either ink reservoirs 22, directly or by means of ducts 24 as schematically illustrated in FIG. 1.

In the example of FIG. 1, the ink terminals 21 are formed at the top of the via sections 20*a*. However, feed layer 6 may comprise further duct sections between the via sections 20*a* and the ink terminals 21 as described for some of the later embodiments.

Several first electric vias 26 extend through feed layer 6. They form at least part of a system of electrically conductive tracks and connect one or more first voltage terminals 28 of feed layer 6 to at least part of the nozzle electrodes 14. For this purpose, the first electric vias 26 of feed layer 6 are connected at their bottom end to the top ends of the electric vias 16 of nozzle layer 4.

The first voltage terminal(s) 28 are connected to a voltage supply 30, which is adapted to generate voltage pulses that control the ejection of ink from the nozzles 8. In this first embodiment, the ink may e.g. be set to a common voltage potential by connecting reservoir 22 to ground. For better visibility, the voltage terminals 28 have been introduced at the position of the electrical vias 26. However, it is understood that generally it is more advantageous to not form the voltage terminal 28 at the position of the electrical vias 26 but instead form them at other locations, including by a fan-out method within a region beyond the circumference of the nozzle layer, as will be shown below. In the process, the size of the voltage terminals 28 can be increased to better allow bonding to a low-resolution PCB or similar interface, and horizontal electrical tracks used to route different electrical vias 26 may be interconnected into a single horizontal track wherever needed.

FIG. 1 shows feed layer 6 to comprise a sublayer 6*a*, which is advantageously a dielectric layer. Feed layer 6 may comprise further sublayers, e.g. for forming further feed duct sections and/or electrical tracks as described for some of the embodiments below.

Sublayer 6*a* forms the via sections 20*a* and it is therefore also called a "via layer". There may be several such via layers. Advantageously, at least the bottommost sublayer of feed layer 6 is such a via layer for vertically transporting ink to the individual nozzles 8.

Feed layer 6 can be used for customizing the function of the nozzles 8, e.g. for disabling some of them. In the embodiment of FIG. 1, this is achieved by two measures:

A) Only a subset of the nozzle electrodes 14 is connected to the first voltage terminal 28. Namely, the nozzle electrode 14 at position A is not connected to nozzle electrode 14 because first electric via 26 in sublayer 6*a* is missing at this position.

B) Similarly, only a subset of the nozzles 8 is connected to the ink terminals 21 via the feed ducts 20. Namely, the nozzle at position A is not connected to a feed duct 20 because the via section 20*a* is missing at this position.

One or both of these measures can be used to disable the nozzle at position A.

In other words, even though nozzle layer 4 has an identical design for each or a majority of the nozzles 8, feed layer 6 can be used to customize said design. This allows manufacturing a large number of identical nozzle layers 4 and adapting them to a specific use by combining them with a customized feed layer 6. Since the structure of feed layer 6 is typically simpler than the one of nozzle layer 4, this results in a reduction of manufacturing costs.

Techniques for manufacturing the various embodiments of the print head are described in more detail in a separate section below.

Second Embodiment

Figure 5:
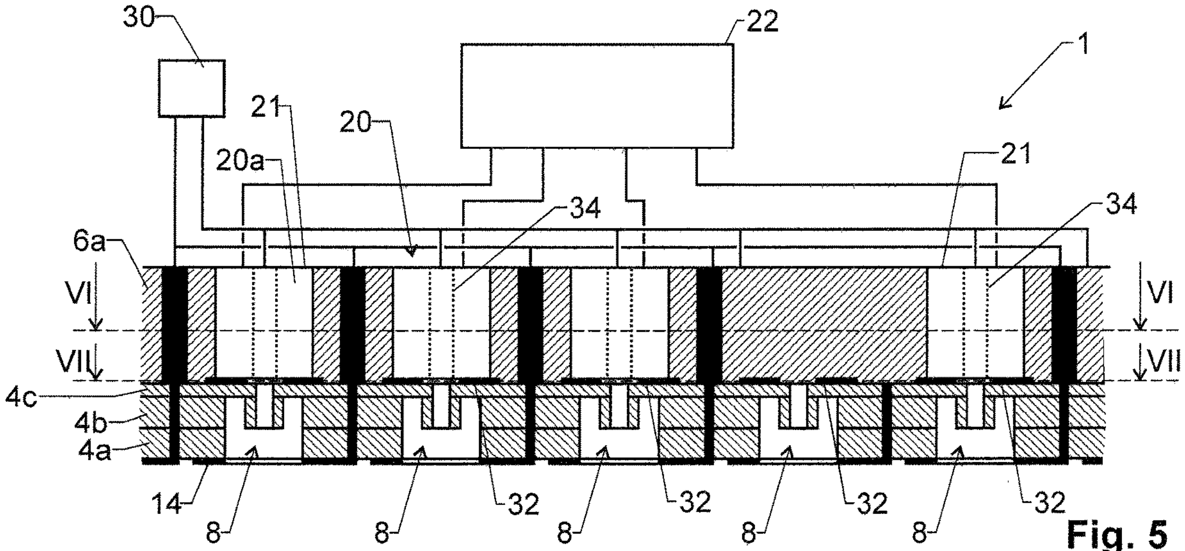
FIG. 5 is a sectional view of a second embodiment of a print head.
Figure 6:
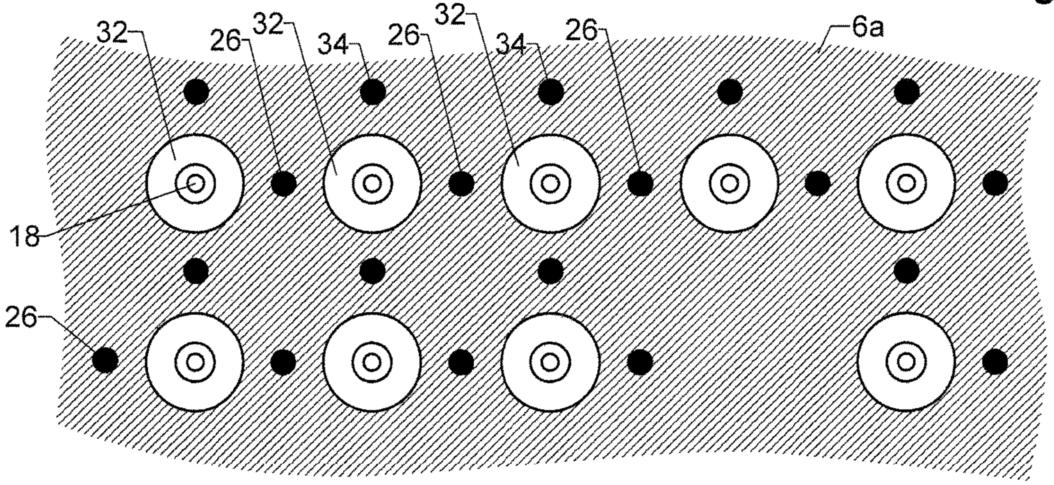
FIG. 6 is a sectional view along line VI-VI of FIG. 5.
Figure 7:
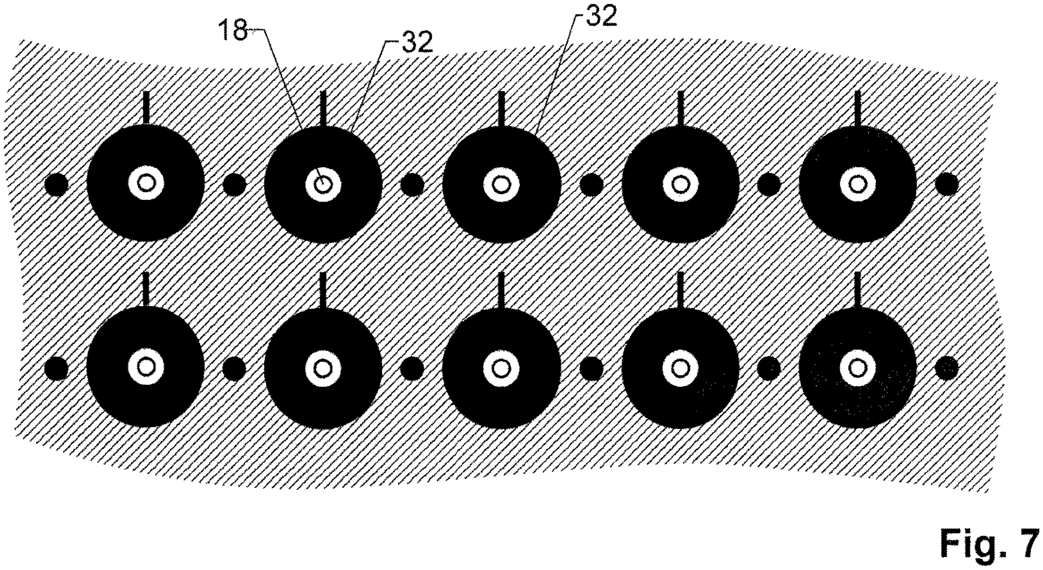
FIG. 7 is a sectional view along line VII-VII of FIG. 5.
Figure 8:
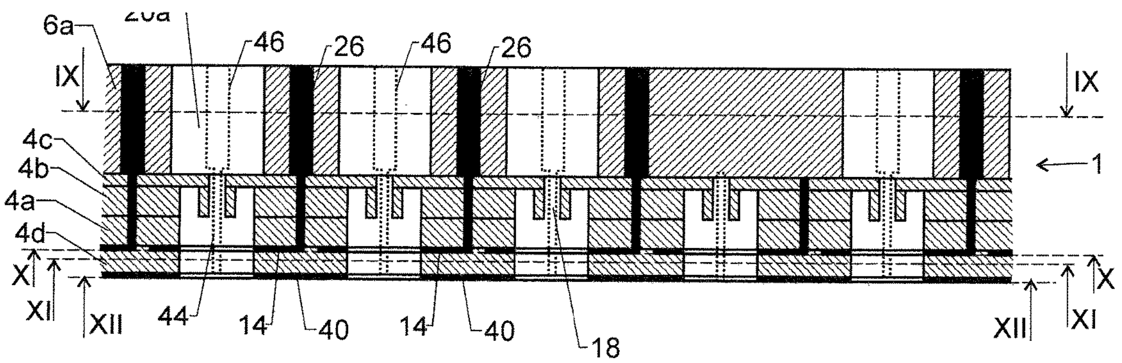
FIG. 8 is a sectional view of a third embodiment of a print head.
Figure 9:
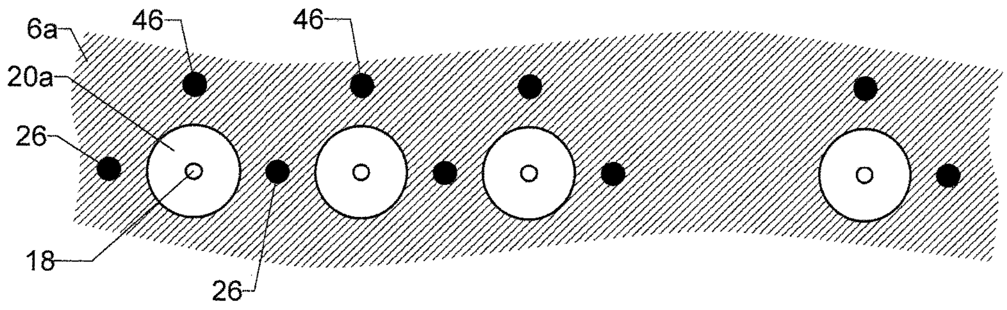
FIG. 9 is a sectional view along line IX-IX of FIG. 8.
Figure 10:
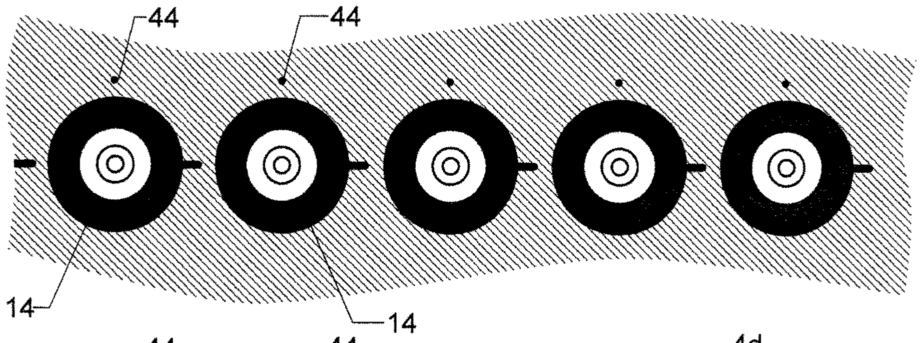
FIG. 10 is a sectional view along line X-X of FIG. 8.
Figure 11:
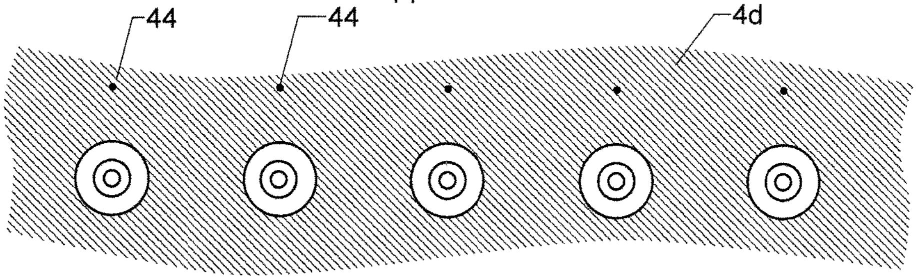
FIG. 11 is a sectional view along line XI-XI of FIG. 8.

FIGS. 5-7 show a second embodiment of a print head 1. It has substantially the same design as first embodiment, with the exception that each nozzle 8 (or at least some of the nozzles 8) comprises a reference electrode 32 positioned to contact the ink in the nozzle.

Advantageously, reference electrode 32 is located at a higher level than nozzle electrode 14, i.e. further way from the bottom side of the print head.

This design allows a better control of the electrical potential of the ink at the location of the nozzles 8.

Advantageously, the reference electrodes 32 are located at a top side of nozzle layer 6. They are also located at a bottom of the ducts 20, which, in the embodiment show, corresponds to the bottom of via sections 20*a*.

The reference electrodes 32 may be annularly arranged around the channels 18 of the nozzles 8 for improving the symmetry of the electrical field at the location of the nozzles.

Second electric vias 34 and/or other types of electrically conducting feedlines extend through feed layer 6 for connecting the reference electrodes 32 to a second voltage terminal 38, which is in turn connected to voltage supply 30.

Advantageously, there are reference electrodes 32 at a majority of the nozzles 8, in particular at all of the nozzles 8, to ensure equal ink ejection properties over a large range of the printing head.

Third Embodiment

FIGS. 8-12 show a third embodiment of a print head 1. It has substantially the same design as the first embodiment, with the exception that it carries a shielding electrode 40 at a level below the nozzle electrodes 14. Shielding electrode 40 reduces crosstalk between neighboring extraction electrodes and/or allows controlling the field between the printing head and the target below it in more controlled manner.

Advantageously, shielding electrode 40 is the bottommost electrode in the print head.

A dielectric sublayer 4*d*, e.g. of silicon dioxide, is advantageously arranged between the nozzle electrodes 14 above it and shielding electrode 40 below it.

Figure 12:
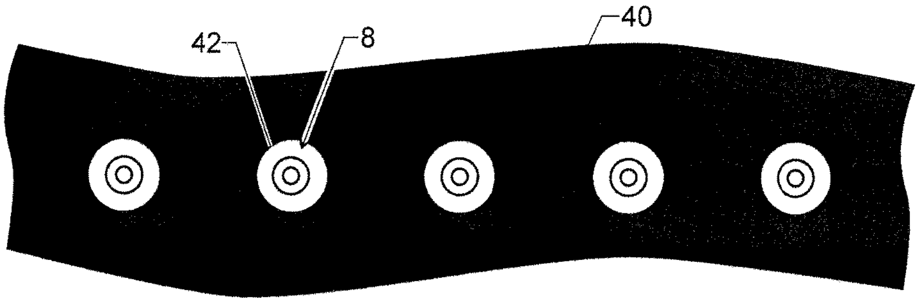
FIG. 12 is a sectional view along line XII-XII of FIG. 8.
Figure 13:
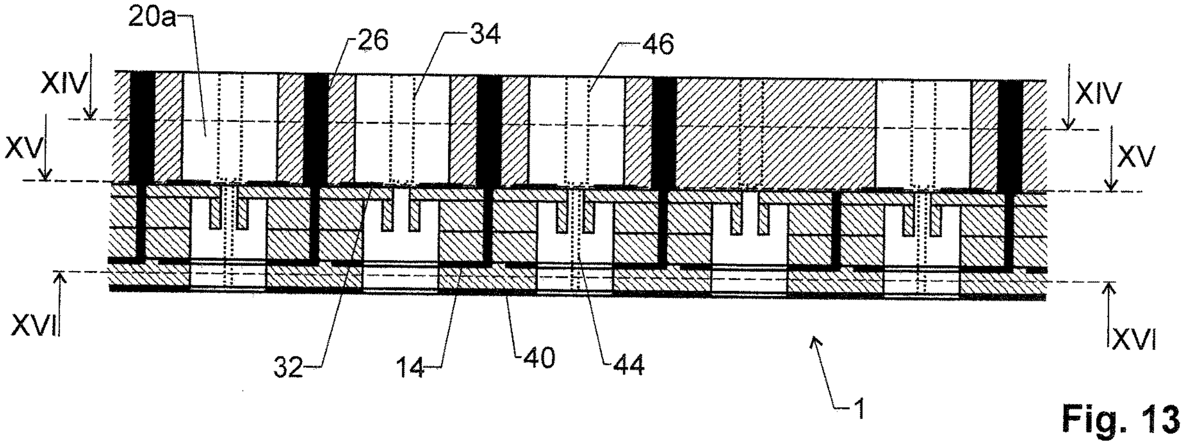
FIG. 13 is a sectional view of a fourth embodiment of a print head.
Figure 14:
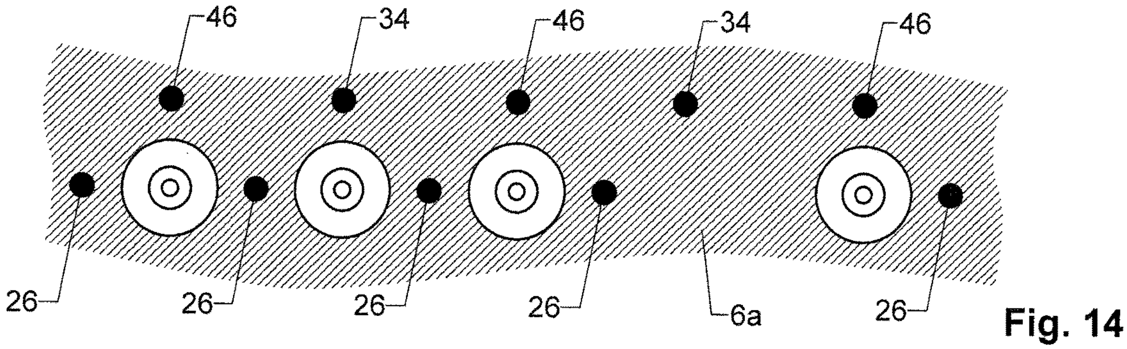
FIG. 14 is a sectional view along line XIV-XIV of FIG. 13.
Figure 15:
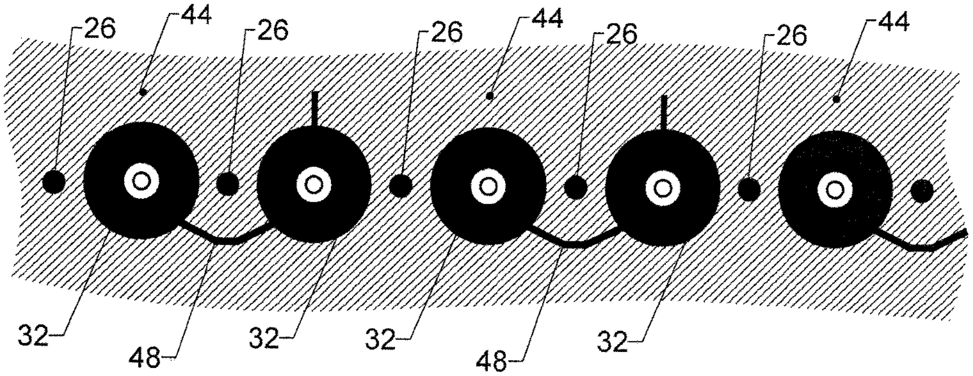
FIG. 15 is a sectional view along line XV-XV of FIG. 13.
Figure 16:
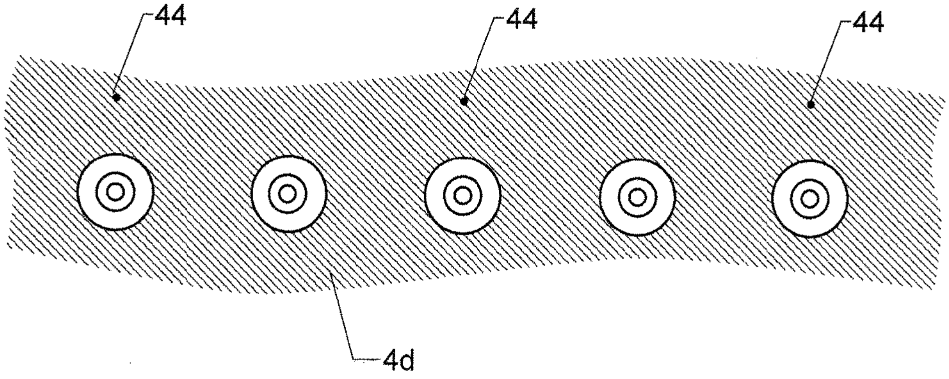
FIG. 16 is a sectional view along line XVI-XVI of FIG. 13.
Figure 17:
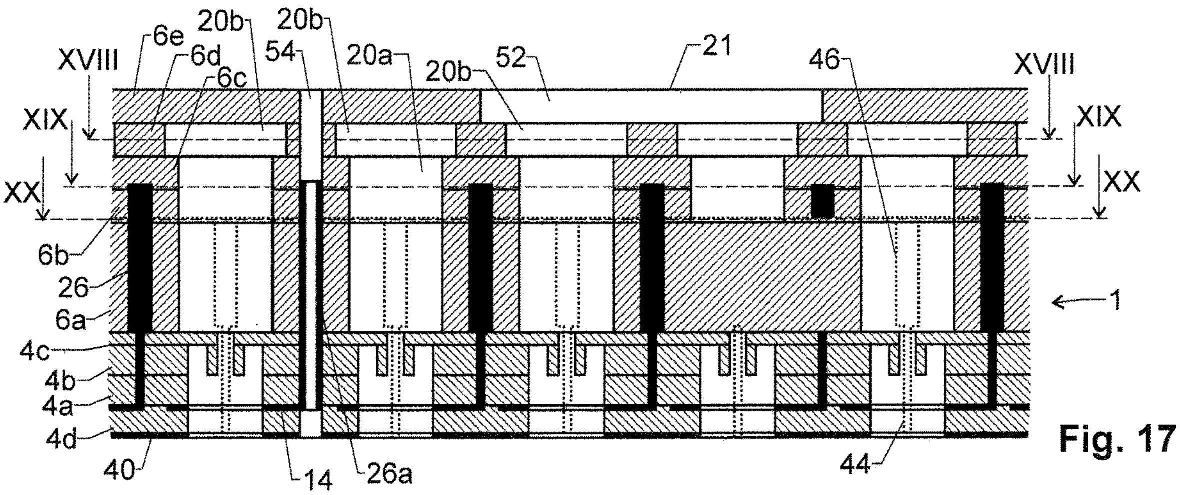
FIG. 17 is a sectional view of a fifth embodiment of a print head.
Figure 18:
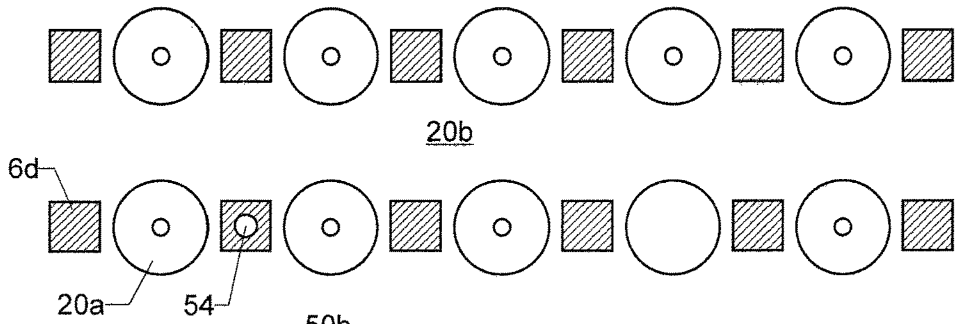
FIG. 18 is a sectional view along line XVIII-XVIII of FIG. 17.

As can be seen in FIG. 12, shielding electrode 40 is advantageously a continuous conducting layer surrounding a plurality of nozzles 8 with openings 42 at the locations below the nozzles 8.

Advantageously, all of shielding electrode 40 are interconnected to be at the same electric potential.

Vias 44, 46 and/or other types of electrically conductive tracks may be provided to connect shielding electrode 40 to a voltage supply above nozzle layer 4. In the third embodiment, these vias have a first section 44 extending through nozzle layer 4 and a second section 46 extending through at least part of feed layer 6.

There may be one such via 44, 46 for shielding electrode 40 per nozzle 8. However, this number may also be smaller, e.g. with there being at least twice, in particular at least ten times, more nozzles 8 than vias 44, 46.

Fourth Embodiment

FIGS. 13-16 show a fourth embodiment of the print head 1, which is, in some sense, a combination of the second and the third embodiment, in that it comprises reference electrodes 32 as well as a shielding electrode 40.

In order to keep the numbers of vias extending through at least part of feed layer 6 low, at least some of the reference electrodes 32 are electrically interconnected by electrically conductive horizontal tracks 48. Hence, the number of electric vias 34 for connecting the reference electrodes can be smaller than the number of nozzles 8.

The horizontal tracks 48 are advantageously arranged in a common plane with the reference electrodes 32, thereby obviating the need of using vias to connect them to the reference electrodes 32.

Similarly, the number of electric vias 46 for connecting shielding electrode 40 can be smaller than the number of nozzles 8.

Fifth Embodiment

The fifth embodiment of print head 1, shown in FIGS. 17-20, illustrates some further techniques that can be used in a print head, either alone or in combination.

One such technique relates to the electrical tracks for connecting the various electrodes to the voltage supply.

In the fifth embodiment, the system of electrical tracks comprises horizontal electrical tracks 50*a*, 50*b* arranged in or on feed layer 6.

There may be several sets of such horizontal electrical tracks 50*a*, 50*b* separated by at least one dielectric layer (layer 6*b* in FIG. 17), which allows to implement complex connectivity schemes.

Figure 20:
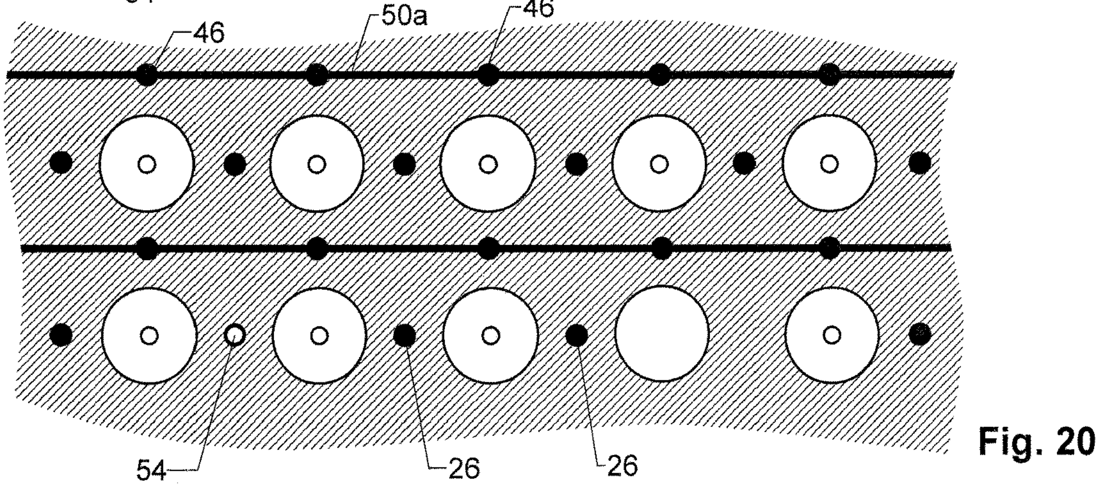
FIG. 20 is a sectional view along line XX-XX of FIG. 17.

For example, and as shown in FIG. 20, there may be a first set of horizontal feed lines 50*a* interconnecting the vias 46 from shielding electrode 40. They are e.g. arranged on top of bottommost sublayer 6*a* of feed layer 6.

In the shown example, the horizontal feedlines 50*a* are parallel to each other, even though another geometry may be used.

Figure 19:
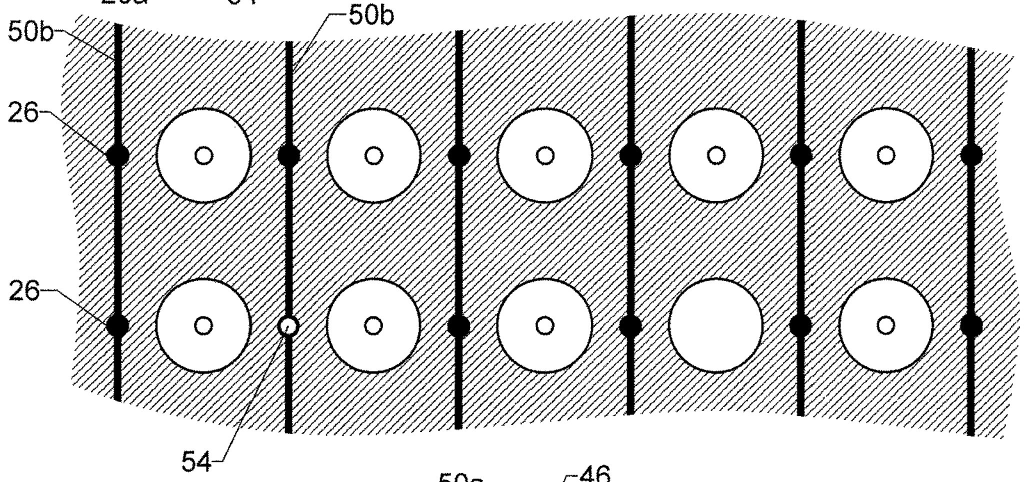
FIG. 19 is a sectional view along line XIX-XIX of FIG. 17.

Further, and as shown in FIG. 19, there may be a second set of horizontal feed lines 50*b* interconnecting the vias 26 from the nozzle electrodes 14. They are arranged e.g. on top of a sublayer 6*b* of feed layer 6.

In the shown example, the horizontal feedlines 50*b* are again parallel to each other, thus creating columns or rows of separately controllable nozzle electrodes 14. Depending on how the nozzle electrodes are to be controlled, other geometries can be used.

Another technique illustrated in the fifth embodiment relates to the geometry of the feed ducts.

While, in the previous examples, the feed ducts 20 comprise via sections 20*a* extending perpendicularly (vertically) through at least part of feed layer 6, the present embodiment also comprises at least one interconnect section 20*b* extending horizontally, i.e. along feed layer 6.

The interconnect section(s) 20*b* is/are formed, in the present embodiment, by at least one opening in a sublayer 6*d* of feed layer 6. This sublayer 6*d* forming the interconnect section(s) 20*b* is called the "interconnect layer". There may be more than one interconnect layer in feed layer 6.

In the shown example, interconnect section 20*b* forms a single cavity in interconnect layer 6*d* and interconnects the via sections 20*a*.

Interconnect layer 6*d* is covered (i.e. closed from above) by yet a further sublayer 6*e* of feed layer 6. One or more openings 52 may be arranged in sublayer 6*e* for forming the ink terminals 21, which connect the print head to one or more ink reservoirs. These openings may have much larger cross section than the via sections 20*a*, which makes them easier to contact.

The openings 52 and therefore the one or more ink terminals 21 can be arranged at the top of the print head or at its edges.

As can be seen, in this embodiment the via sections 20*a* extend through several sublayers of feed layer 6, namely through sublayers 6*a*, 6*b*, 6*c*. Hence, these sublayers 6*a*, 6*b*, 6*c* form "via layers" as defined above.

The fifth embodiment illustrates yet another technique that can be advantageously combined with any of the embodiments shown here, namely the use of vent ducts 54. One such vent duct 54 is shown in FIGS. 17-20, even though there are typically several such vent ducts in the printing head, advantageously at least one or at least two per nozzle 8.

The vent ducts 54 extend through feed layer 6 and nozzle layer 4, and they can be used to vent the space between the print head and the target. In particular, a gas can be guided through them, either in an upward or in a downward direction, typically in an upward direction in some vent ducts and in a downward direction in others. Such a gas can be used e.g. for drying and/or conditioning the region where printing takes place. It may also be an inertial gas preventing chemical reactions or a reactive agent expediting a chemical reaction of the ink.

As illustrated in the drawings, such vent ducts 54 may comprise electrical vias 26*a* extending through them. These vias 26*a* are advantageously formed by a metallic coating that dads all or part of the interior wall of the vent ducts 54.

In the shown embodiment, the via 26*a* is one of the vias connected to the nozzle electrodes 14. Some or all of the vias 26 can be implemented in vent ducts. The same applies to the vias 44, 46 for shielding electrode 40 or (in the embodiment of FIG. 5 or 13), to the vias 34 connected to the reference electrodes 32.

In more general terms, the print head may, in any of the embodiments of the invention, not only in the fifth embodiment, comprise cavities extending at least through part of the print head, such as e.g. the vent ducts 54. At least some of the vias 26, 44, and/or 46 may comprise a conductive surface coating in at least part of said cavities without completely filling said cavities.

The fifth embodiment illustrates another technique that can be advantageously applied to all embodiments.

As can be seen, the via sections 20*a* and the parts of interconnect section 20*b* adjacent to them have constant or decreasing cross section along the top-down direction. Hence, there are no widening parts in the feed duct along the flow of the ink. Such widening parts might hinder a proper wetting of the via sections 20*a* and therefore hamper the ink flow.

Sixth Embodiment

Figure 21:
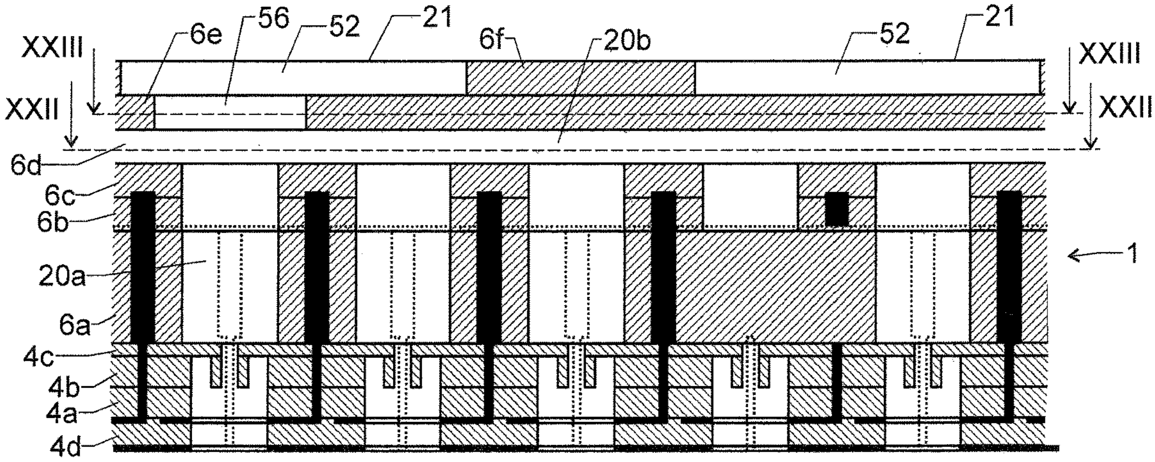
FIG. 21 is a sectional view of a sixth embodiment of a print head.
Figure 22:
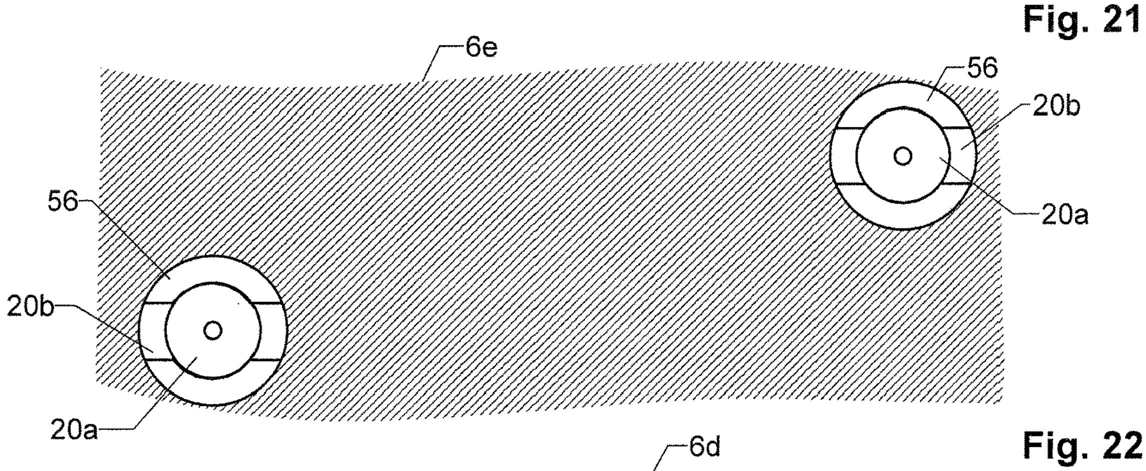
FIG. 22 is a sectional view along line XXII-XXII of FIG. 21.
Figure 23:
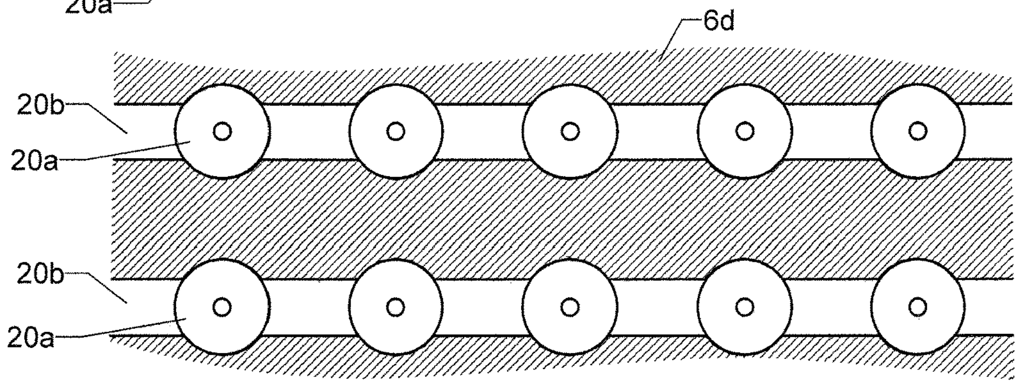
FIG. 23 is a sectional view along line XXIII-XXIII of FIG. 21.

The sixth embodiment of print head 1 is illustrated in FIGS. 21-23.

In contrast to the fifth embodiment, it comprises several interconnect sections 20*b*, which are not connected to each other. Each interconnect section 20*b* is connected to a subset of the nozzles 8. This allows feeding different types of ink to the nozzles 8. There may be a first subset of nozzles that spray a first ink and a second subset of nozzles that spray a second ink.

The interconnect sections 20*b* are again formed by openings in sublayer (interconnect layer) 6*d*.

Sublayer 6*e* forms via sections 56 connecting the interconnect sections 20*b* to larger openings 52 in a top sublayer 6*f*. Openings 52 form the ink terminals 21 for connecting the print head to ink reservoirs.

The embodiment of FIG. 21 comprises a sublayer 6*c* between the first set of horizontal electrically conducting feed lines 50*a* and the interconnect sections 20*b*.

Figure 24:
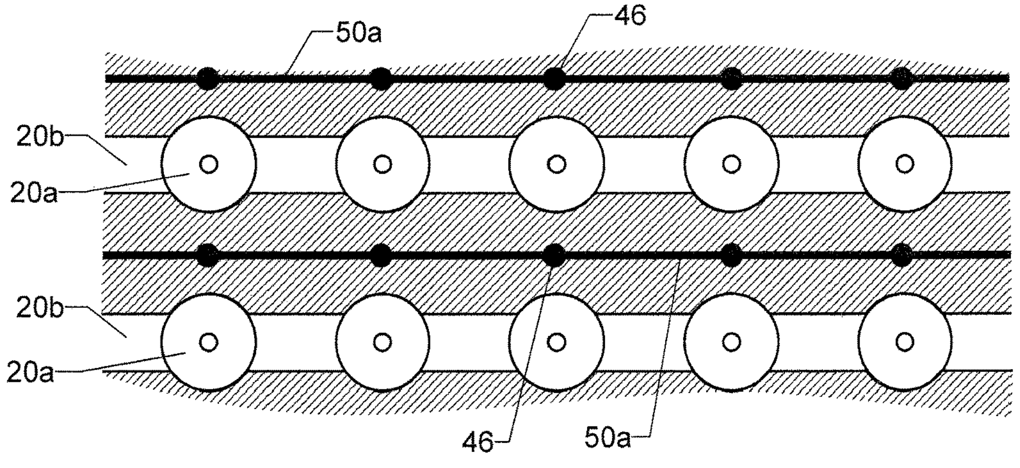
FIG. 24 is a sectional view, corresponding to FIG. 23, of an alternative to the sixth embodiment.

This sublayer may, however, also be omitted, in which case the first set of horizontal feed lines 50*a* may be arranged adjacent to the bottom side of interconnect layer 6*d*. This is illustrated in FIG. 24. Advantageously, the interconnect sections 20*b* in interconnect layer 6*d* are positioned to be away from the feed lines 50*a* in order to avoid contact of the feed lines 50*a* with the ink.

Seventh Embodiment

Figure 25:
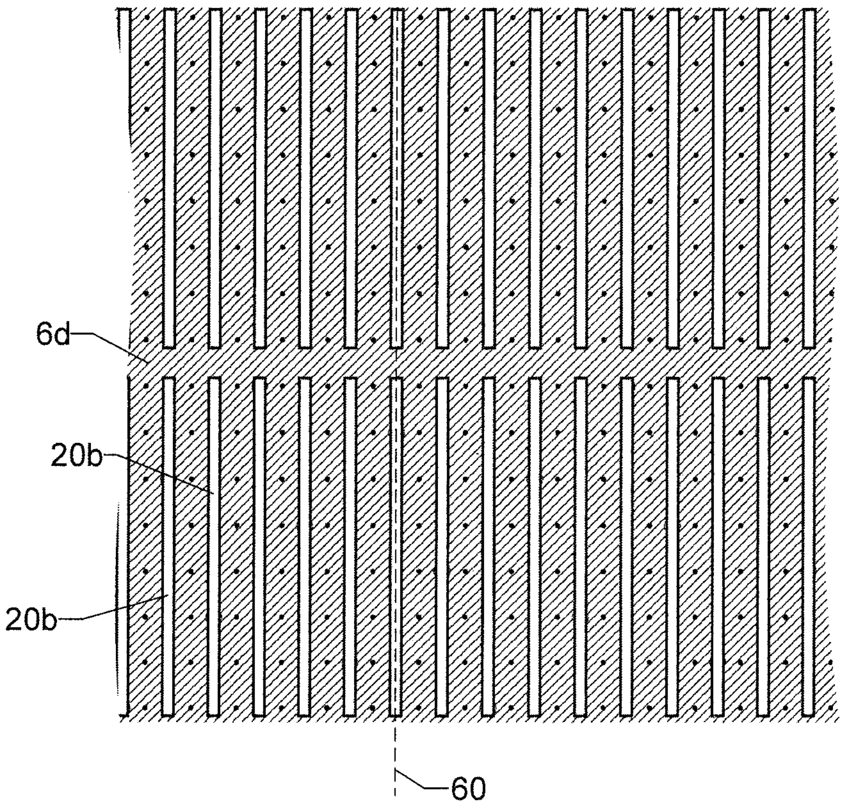
FIG. 25 is a sectional view of an interconnect layer of a seventh embodiment of the print head with a first set of interconnect sections.
Figure 26:
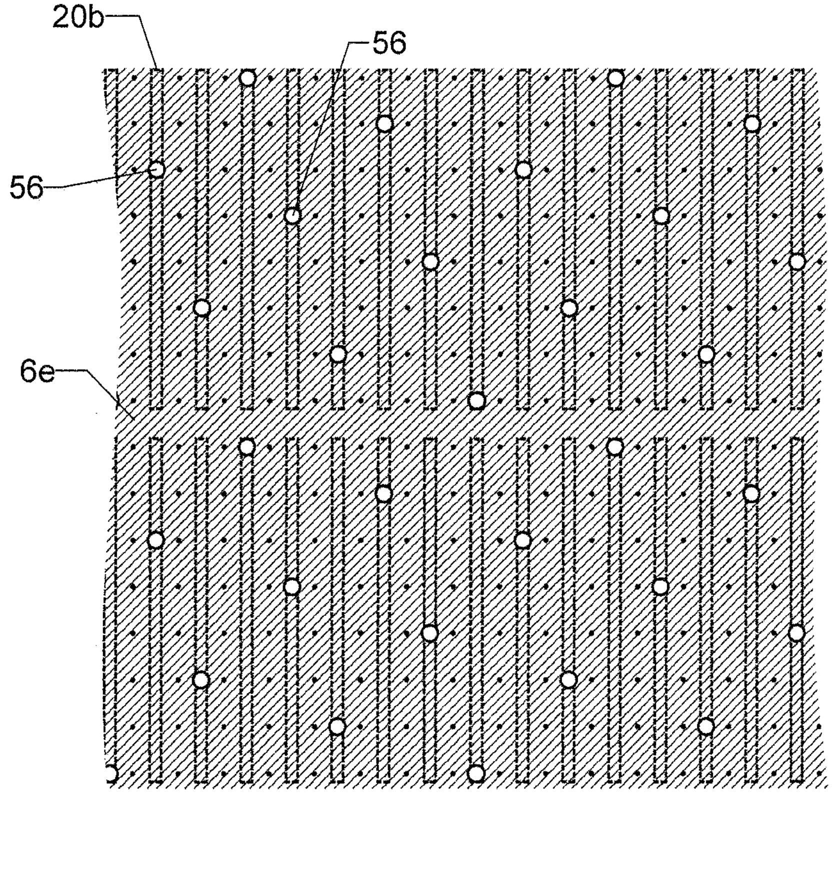
FIG. 26 is a sectional view of a via layer of the seventh embodiment of the print head.
Figure 27:
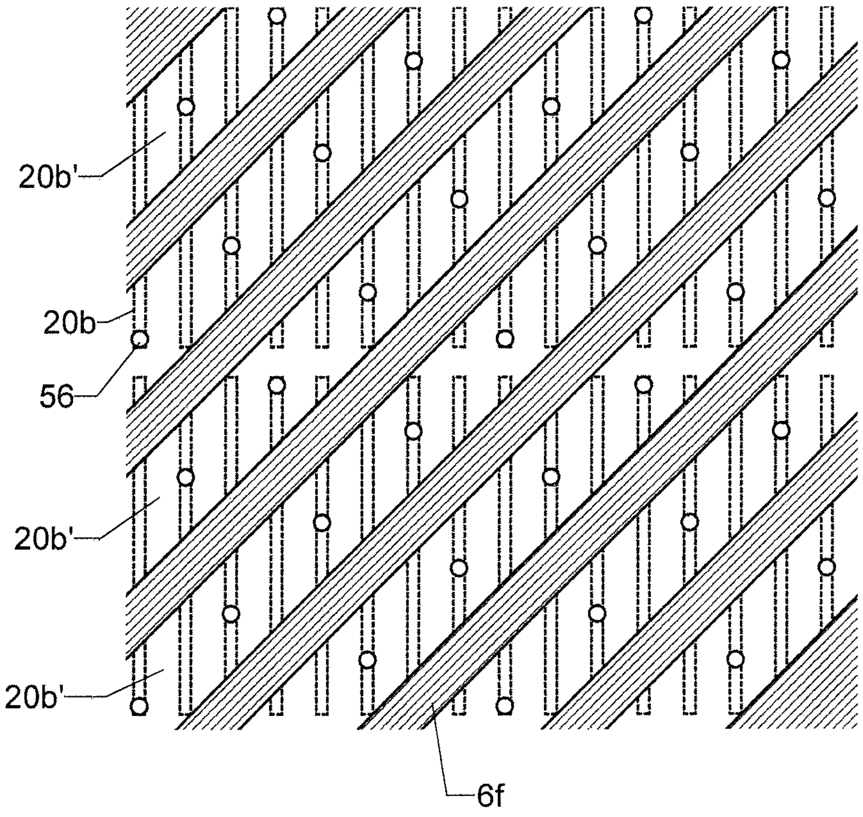
FIG. 27 is a sectional view of another interconnect layer of the seventh embodiment of the print head with a second set of interconnect sections.
Figure 28:
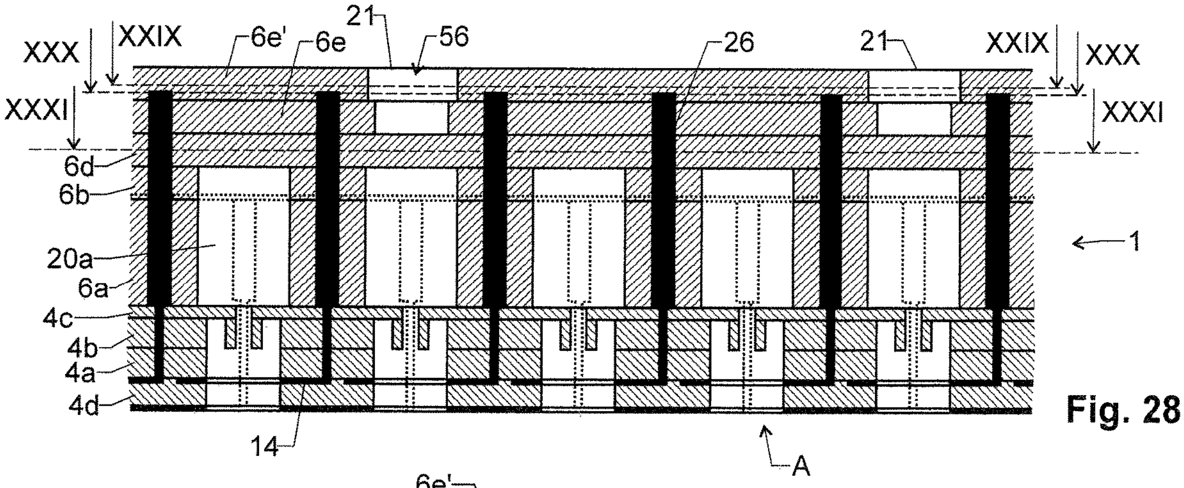
FIG. 28 is a sectional view of an eighth embodiment of a print head.
Figure 29:
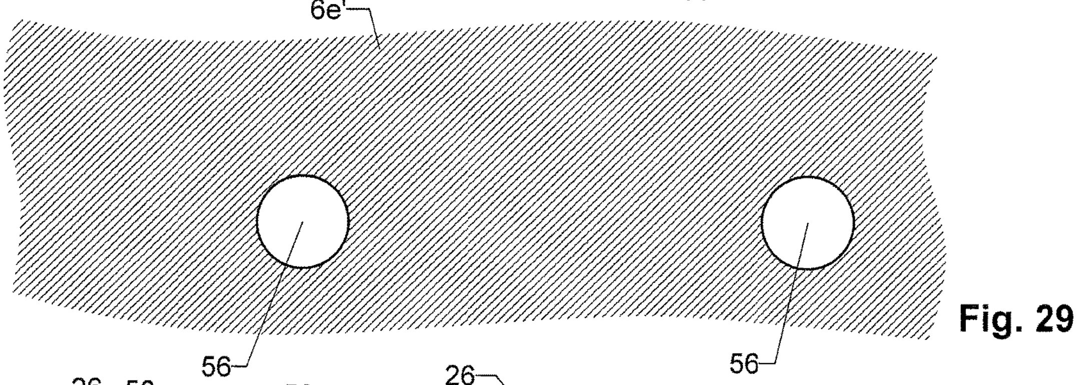
FIG. 29 is a sectional view along line XXIX-XXIX of FIG. 28.

FIGS. 25 to 27 show the design of the interconnect sections of a seventh embodiment of the print head. It may e.g. be based on the design of the sixth embodiment (FIG. 21).

FIG. 25 shows a horizontal section through sublayer 6*d* (corresponding to FIG. 23, but with a smaller magnification and rotated by 90°). Sublayer 6*d* is an "interconnect layer" forming a first set of interconnect sections 20*b*, each of which connects a subset of the via sections 20*a*. The interconnect sections 20*b* of the first set extend parallel to each other.

FIG. 26 shows a horizontal section through sublayer 6*e*, which is arranged above sublayer 6*d* and is a "via layer" forming via sections 56. Each of the interconnect sections 20*b* of the first set is connected to at last one of the via sections 56.

FIG. 27 shows a horizontal section through sublayer 6*f*, which is arranged above sublayer 6*e* and is again an "interconnect layer" forming a second set of interconnect sections 20*b'* and being connected to a subset of the via sections 56. The interconnect sections 20*b'* of second set extend parallel to each other.

The second set of interconnect sections 20*b'* can be connected to one, two, or more ink terminals for connecting the print head to one or more ink reservoirs.

This design allows integrating, in some sense, several printing heads (i.e. printing heads for different inks) in a single printing head. Furthermore, in this example, the interconnect ducts become larger from the first set of interconnect sections 20*b* to the second set of interconnect section 20*b*', and the pitch between them becomes larger as well. This allows easier attachment of the print head to an external ink supply. It is understood that this process may be continued with further sublayers, e.g. by once more forming an additional "via layer" of top of the "interconnect layer" 6*f*, where only one via may be sufficient to connect to a single interconnect section 20*b'* of the second set.

The interconnect ducts of the first set 20*b* and the second set 20*b'* extend transversally to each other, advantageously non-perpendicularly.

The first set of interconnect sections 20*b* comprises a plurality of ducts arranged along a single line, such as the interconnect sections arranged along line 60 of FIG. 25, with the individual interconnect sections 20*b* along said line being separated from each other by material of the interconnect layer 6*d*. This allows to easily cut a wafer for forming several print heads without the need to close the interconnect sections 20*b* at the edges.

Eighth Embodiment

The embodiment of FIGS. 28-31 of print head 1 optimized to manufacture most of the layers at the wafer-level, i.e. where customization for a certain application can take place at a late manufacturing step. The techniques shown here can be combined with any of the other embodiments.

Here, each nozzle 8 is connected by means of the feed ducts and to an ink terminal 21, even at those locations A where a nozzle 8 is to remain inactive. This is in contrast to what is shown in the other embodiments where inactive nozzles 8 were cut off from the ink terminals 21.

In the previous embodiments, there were electrical vias 26 for only a part of the nozzles. In this embodiment, there may be electrical vias 26 for all nozzle electrodes 14, and they extend at least through the bottommost sublayer(s), in particular sublayer 6*a*, of feed layer 6, which allows manufacturing this/these sublayer(s) in identical manner for all print heads with customization taking place only at the upmost layer(s).

Advantageously, the electric vias 26 extend higher than at least the bottommost interconnect layer 6*d*, which allows interconnecting at least part of the feed ducts for the individual nozzles 8 into larger channels, leaving more space for flexibly wiring the electrical vias 26 together.

In the embodiment shown, the electrical vias 26 extend through the sublayers 6*a*, 6*b*, 6*d* before they are wired to horizontal electrical tracks 50.

Advantageously, these horizontal electrical tracks 50 are arranged between two via sublayers 6*e*, 6*e'* (i.e. layers forming via sections) where there is more room for the wiring.

Figure 30:
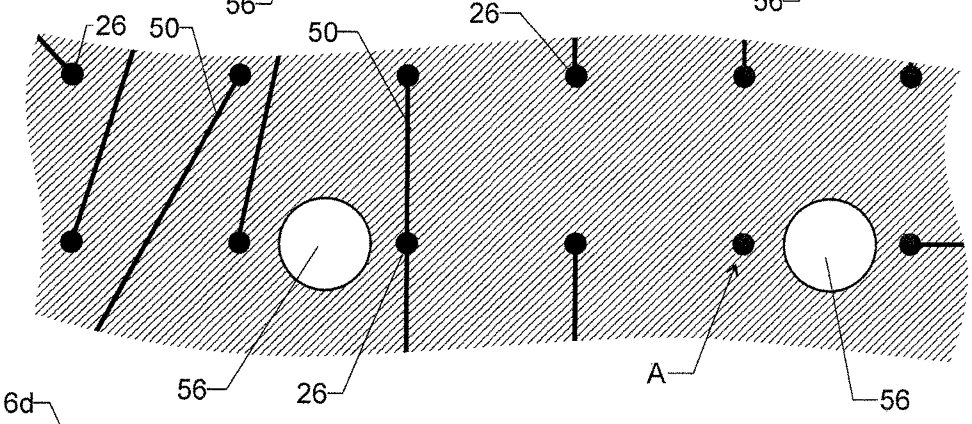
FIG. 30 is a sectional view along line XXX-XXX of FIG. 28.
Figure 31:
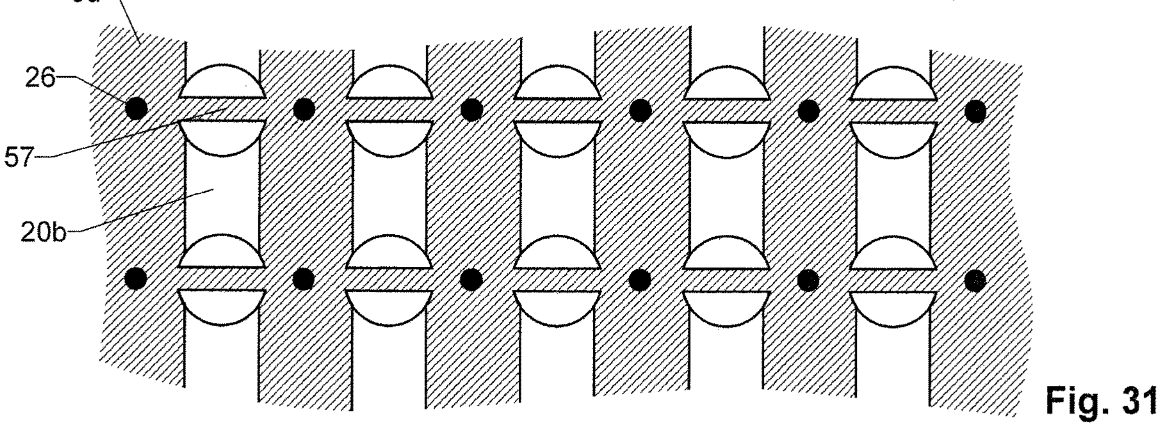
FIG. 31 is a sectional view along line XXXI-XXX.I of FIG. 28.

As shown in FIG. 30 for location A, the electrical vias 26 for inactive nozzles 8 may e.g. remain unconnected.

In this embodiment, all customization of the print head can be carried out at a level higher than the bottommost interconnect layer 6*d*, i.e. all sublayers 4*a*-4*d* of nozzle layer 4 and the bottommost sublayer(s) of feed layer 6 can be mass-produced at low cost at the wafer level before dicing the wafer.

In this embodiment, the diameter of the via sections in sublayer 6*e* is smaller than the diameter of via sections in sublayer 6*b* which is a lower sublayer of the feed layer 6. As introduced before, filling of liquid into a lower sublayer of the feed layer can be impossible in such a situation. In this case, however, the interconnect sections 20*b* on sublayer 6*d* are not continuous but are interrupted at the location of underlying via sections 56, essentially building a bridge 57 across the via sections 56. This bridge eliminates potential wetting stops that are created at overhanging interfaces from a higher to a lower sublayer.

Such bridges can be introduced also at other regions where the ink has to pass from an upper to a lower sublayer of the feed layer 6. The use of such bridges to enhance filling of the ink towards lower sublayers of the feed layer 6 is particularly advantageous in case the material the feed layer is made of has low wettability by the ink.

In fact, using an ink-repellant material can be beneficial for reducing the deposition of material contained in the ink at walls of the feed ducts. For this purpose, one may specifically coat walls of the feed ducts with an ink-repellant coating. A coating material, such as FDTS or Teflon, is applicable as long as it forms a contact angle with the ink that is smaller than 90° but advantageously still larger than 30°.

Hence, in more general terms and in any embodiment, the print head may comprise a coating on at least some of the inner walls of the feed ducts that exhibits a contact angle with the ink that is smaller than 90°, and in particular still larger than 30°. The invention also refers to using the print head with an ink that forms said contact angle with the coating. In particular, said coating may be of FDTS and/or Teflon.

Also, in more general terms and in any embodiment, the print head may comprise bridges 57 extending across at least some of the feed ducts 20*a*, 20*b* at locations where the diameter of the feed ducts 20*a*, 20*b* increases along the flow of the ink (i.e. along the up-down direction). In an advantageous embodiment, the bridges extend across via sections 20*a*, 56 at the location where the vertical via sections 20*a*, 56 intersect with horizontal interconnect sections 20*b*.

Interface

Figure 32:
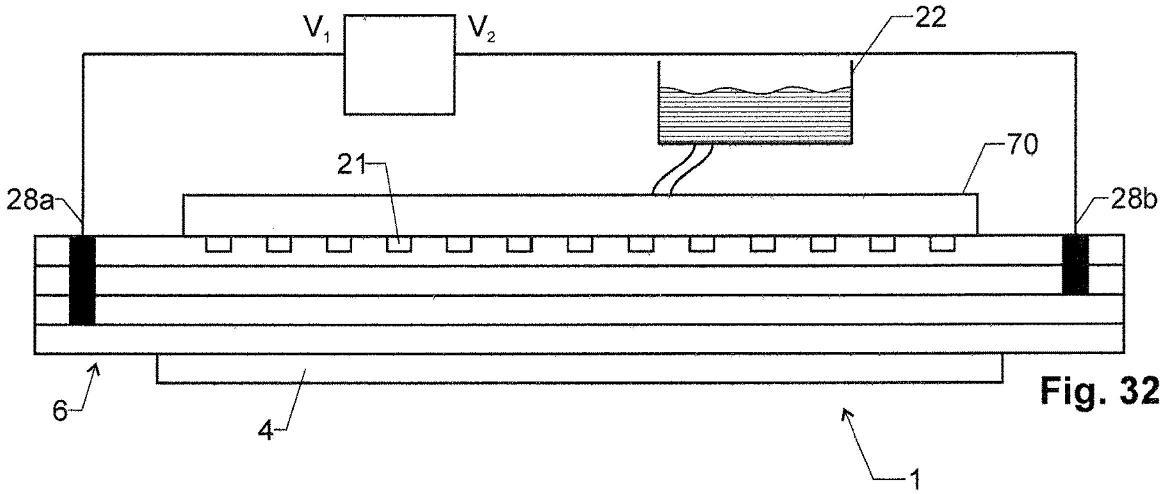
FIG. 32 is a schematic view illustrating a first variant for connecting the print head to a voltage source and ink reservoir.

FIG. 32 shows first variant of an interface for connecting print head 1 to voltage source 30 and ink reservoir 22.

Voltage source 30 is connected to the electrical terminals 28*a*, 28*b* of print head 1, which in turn are connected to the electrical tracks of the print head 1.

Ink reservoir 22 is connected to a liquid distribution connector 70, which is in turn connected to the to the ink terminals 21 of print head 1 and thereby to the feed ducts 20.

Figure 33:
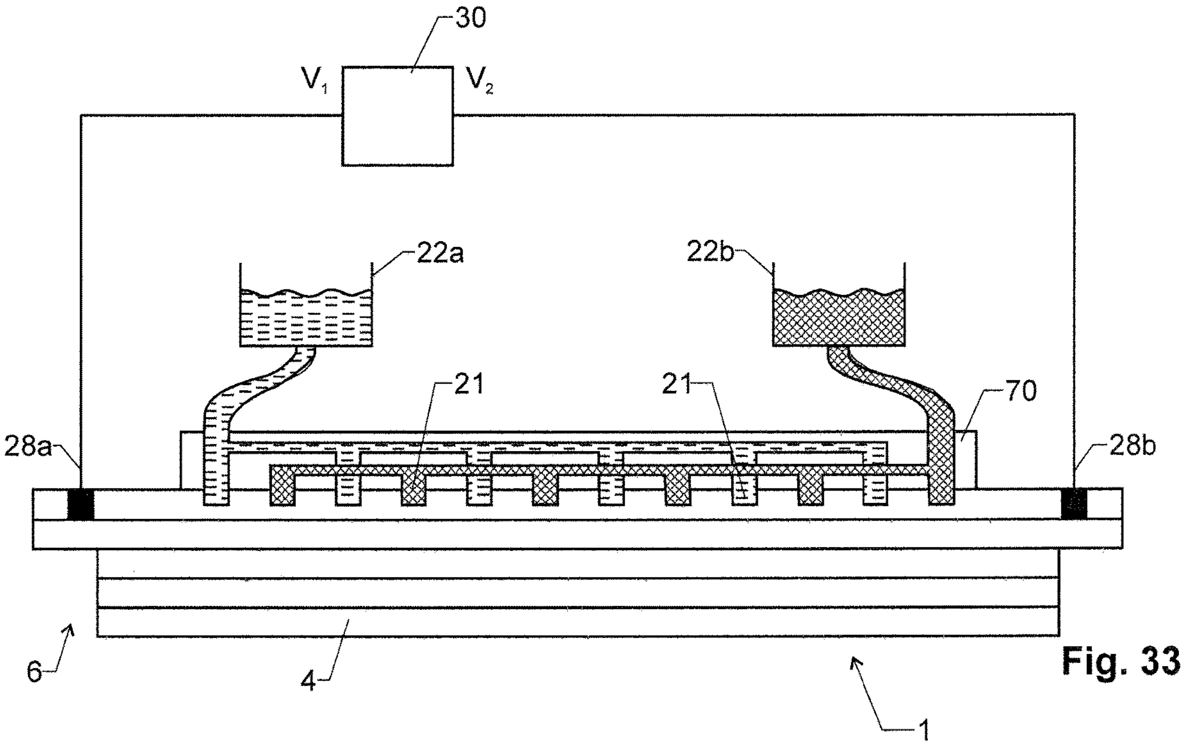
FIG. 33 is a schematic view illustrating a second variant for connecting the print head to a voltage source and several ink reservoirs.

FIG. 33 shows a second variant of an interface for connecting print head 1 to a voltage source 30 and two or more different ink reservoirs 22*a*, 22*b*. Both ink reservoirs 22*a*, 22*b* are connected to a suitably designed liquid distribution connector 70.

As mentioned, the ink terminals 21 for feeding ink to print head 1 may be arranged at the top side of print head 1 or at one or more of its edges.

In the embodiments shown in FIG. 32 and FIG. 33, the feed layer 6 is shown to be horizontally larger in lateral extent than the nozzle layer 4. This allows to form the electrical terminals 28*a*, 28*b* in a fan-out fashion, outside the region that may be used for other purposes, e.g. for attachment of the liquid distribution connector 70. In the embodiment of FIG. 32 electrical terminals 28*a*, 28*b* progress down to the lowest sub-layer of the feed layer 6, because the electrical tracks originating from different electrodes are not routed towards the respective electrical terminal 28*a*, 28*b* at the same sublayer. However, unless the print head 1 is not equivalent in size to the whole wafer, the respective feed layer 6 for such a print head 1 can only be formed after dicing the wafer into pieces, i.e. it cannot be formed on a wafer level.

Since wafer-level manufacturing is more economic, it is generally advantageous to form all electrical terminals 28*a*, 28*b* at the same sublayer of the feed layer 6, to a sublayer that is located as high as possible in the stack. This means that electrical tracks originating from different electrodes must be routed via electrical vias to the respective sublayer of the feed layer, before using horizontal electrical tracks to bring them to the respective electrical terminals 28*a*, 28*b*. At the same time, some or all sublayers of the feed layer 6 located below can be formed on a wafer-level, and hence they will have the same size as the nozzle layer 4. This is illustrated in FIG. 33 where the electrical terminals 28*a*, 28*b* are formed on a single sublayer of the feed layer 6.

In more general tears and in any embodiment, nozzle layer 4 advantageously has a smaller horizontal extension (in at least one direction) than at least part of the sublayers of feed layer 6.

Partitioning

Figure 36:
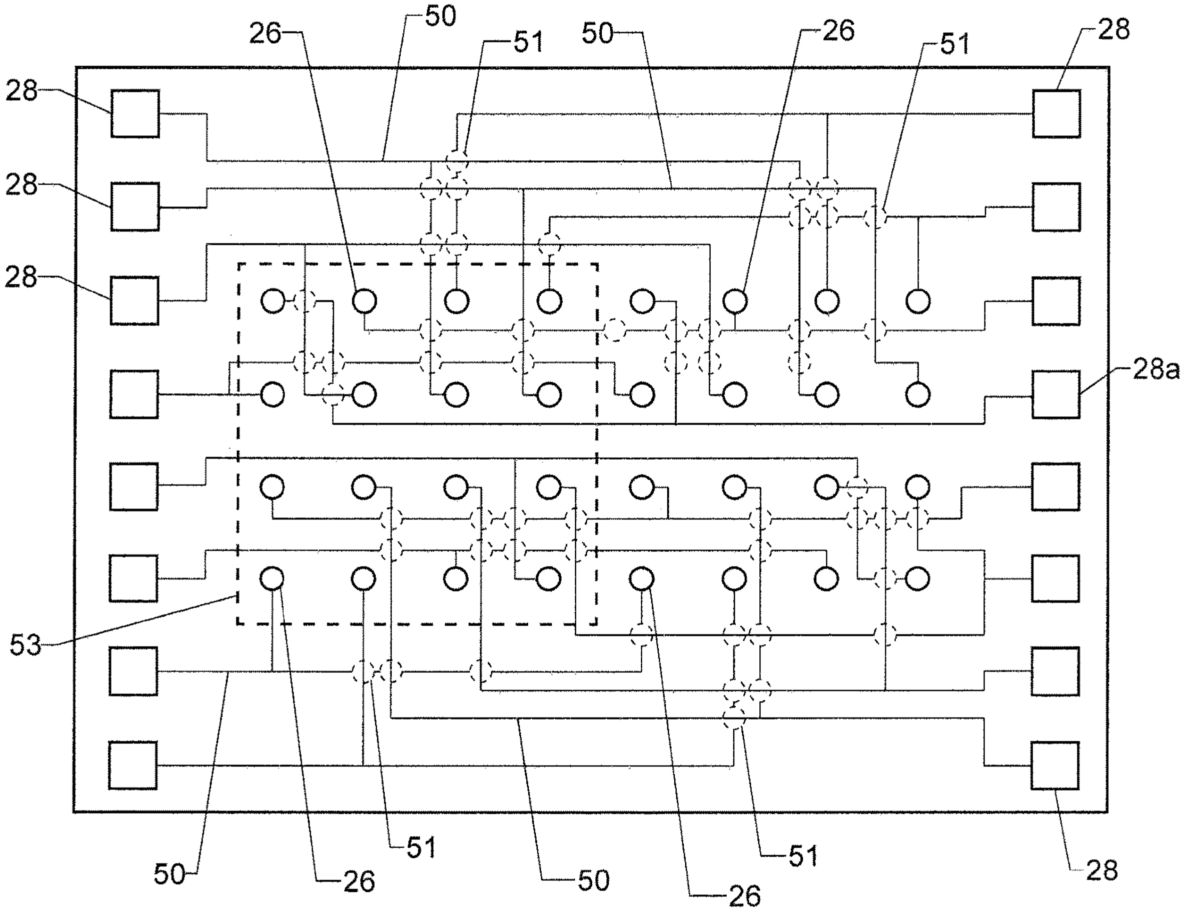
FIG. 36 shows an embodiment of the wiring of the nozzle electrodes.

FIG. 36 illustrates another advantageous technique. This figure shows a schematic representation of the wiring for the nozzle electrodes of the print head. The solid circles represent the electrical vias 26, with each of them connected to one nozzle electrode. The thin solid lines represent horizontal electrical tracks 50 connected to the vias 26. Dotted circles represent dielectric patches 51 used to mutually insulate separate tracks 50 at their points of intersection. The squares show the voltage terminals 28.

The print head has a plurality of area fractions 53, one of which is shown in dotted lines in the figure. Advantageously, there is a two-dimensional array of such area fractions 53 tesselating a two-dimensional, regular array of the nozzles 8.

The number of such area fractions 53 is advantageously large, in particular at least 100.

Each area fraction 53 comprises the same number and arrangement of nozzles. In the example of FIG. 36, for example, each area fraction 53 comprises 4×4 nozzles. Advantageously, each area fraction 53 comprises at least 9, in particular at least 16, in particular at least 25 nozzles. The nozzles in each area fraction 53 are advantageously arranged in a square or in a two-dimensional rectangular array.

The tracks 50 are arranged such that all nozzles contained within each single area fraction 53 are connected to separate voltage terminals 28. In FIG. 36, for example, the top-left nozzle of each area fraction 53 is connected to voltage terminal 28*a*.

Further, the nozzle electrodes of all nozzles at a given coordinate of all the area fractions 53 are connected to the same voltage terminal. In FIG. 36, for example, the nozzles at top-left coordinate of the area fractions 53 are all connected to the same voltage terminal 28*a*.

This embodiment is best combined with the eighth embodiment, which is described above in reference to FIGS. 28-31. In other words, the tracks 50 interconnecting the vias 26 from the nozzle electrodes and the voltage terminals 28 are best arranged above the interconnect layer(s) 6*d* of the print head. This allows to mass-produce the area fractions 53 and their feed ducts with identical properties. After that, the electrical wiring of the nozzle electrodes of the area fractions 53 can be defined for smaller batches of print heads, e.g. adapted to specific needs.

The tracks 50 and the dielectric patches 51 are advantageously manufactured using electrohydrodynamic printing.

Manufacturing Techniques

As mentioned, manufacturing the print head may comprise at least the following three steps:

a) Manufacturing nozzle layer 4 with the nozzles 8.

b) Manufacturing feed layer 6.

c) Forming the feed ducts 20 for the ink and the feed lines 26, 46, 50*a*, 50*b* for the electrical connections in feed layer 6.

The order of these steps may vary.

Figure 34:
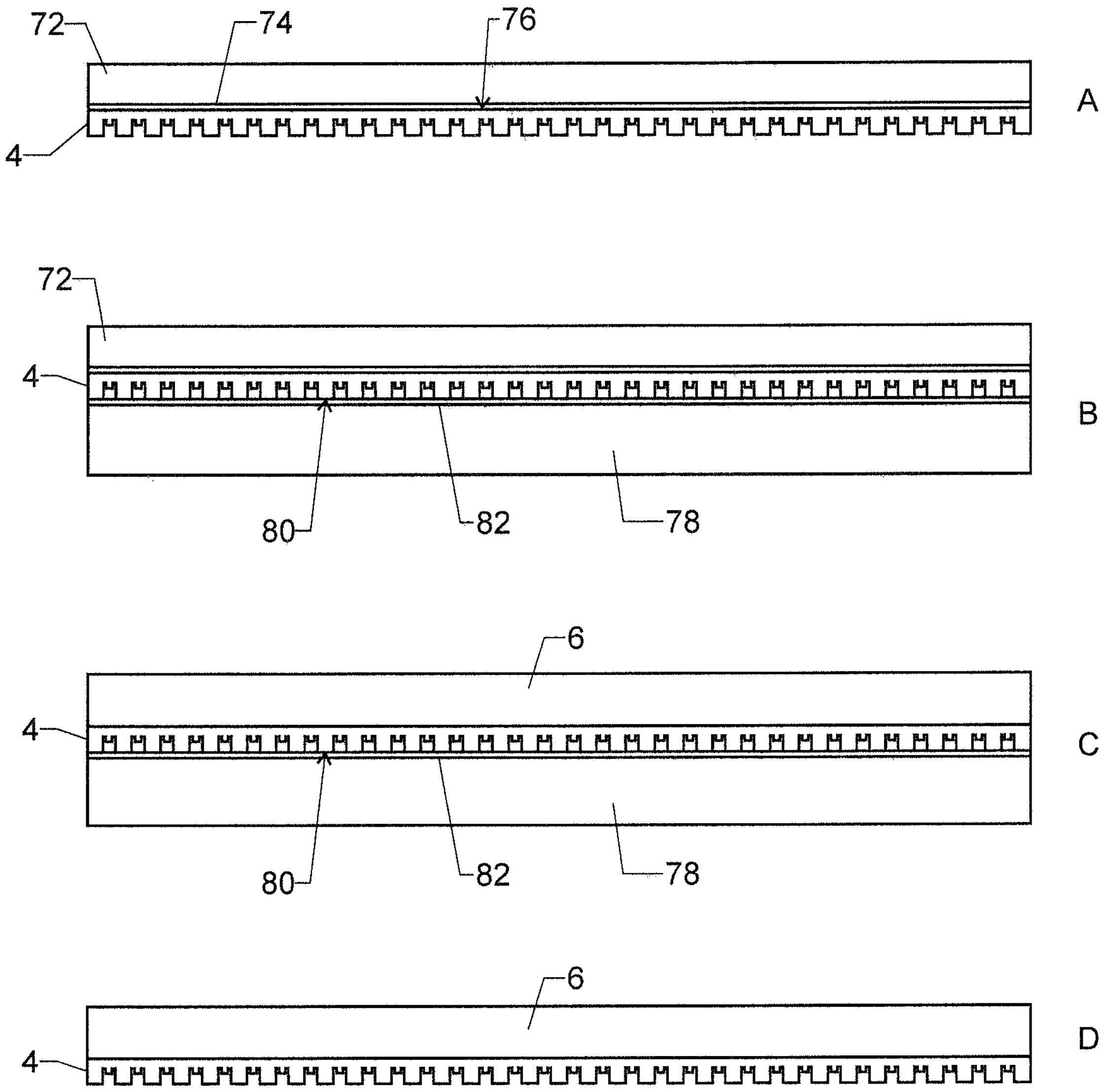
FIG. 34 illustrates a first embodiment of possible steps for manufacturing the print head.

FIG. 34 illustrates a possible sequence of steps for manufacturing the print head.

In step A, nozzle layer 4 is manufactured on a first carrier plate 72. A first release layer 74 is formed on carrier plate 72.

The material of first release layer 74 may be a temperature-stable temporary bonding material, for example a polymeric material that can be spin-coated and hard-baked. Temporary bonding materials with high temperature-stability are often designed to be laser-debonded in the further process. Most preferable materials are used which are commonly used also in the "RDL (redistribution layer) first" semiconductor packaging production scheme as it is well known to those skilled in the art. Such materials are made to be the origin of subsequent material deposition on top of them, including deposition by high-temperature processes such as CVD or PECVD deposition. As consequence the nozzle layer 4 can be formed from scratch by depositing and structuring materials as required, on top of the first release layer.

Nozzle layer 4 is manufactured with its first surface 76 advantageously being the surface facing away from the ejection side of the nozzles 8, i.e. it is the top surface of nozzle layer 4, which allows manufacturing the spouts 10 on sublayer 4*c* using conventional anisotropic etching techniques such as inductively coupled plasma etching.

In step B, after completing nozzle layer 4 at least in part, advantageously fully, a second carrier plate 78 is applied to a second side 80 of nozzle layer 4 with a second release layer 82 between them. Second side 80 is opposite to first side 76, i.e. second side 80 is advantageously the bottom side of nozzle layer 4.

Then, first release layer 74 is released, e.g. be mechanical debonding, laser debonding, or chemical debonding, in order to detach first carrier plate 72 from nozzle layer 4. As mentioned above, first release layer 74 is preferably debonded by laser.

Now, in step C, at least part of feed layer 6 is applied to first side 76 of nozzle layer 4. This bonding process can be executed by various means. For example, layer 6*a* may be bonded to nozzle layer 4 with a permanent adhesive that can be previously patterned by photolithography in order to represent the different holes required for the via sections and electrical vias. Such a permanent adhesive may be chemically based on SU8 or other epoxy-based photoresist. In principle, layer 6*a* may even itself be made of such a material and be directly bonded to the nozzle layer 4 upon the proper bonding conditions, e.g. by heat and pressure. Other ways of permanent bonding include (activated) fusion bonding, eutectic bonding, anodic bonding, or other forms known by those skilled in the art.

Some of these bonding techniques may require high temperatures in the process. Hence, the second release layer 82 is advantageously made of a temperature-stable temporary bonding material as well.

Furthermore, at the time of bonding, all sublayers contained in the at least partially completed feed layer 6 should be temperature-stable as well, at least to the degree required by the bonding process.

Hence, upon bonding, preferably all the sublayers contained in the at least partially completed feed layer are made of glass. In addition, in order to enhance anodic or eutectic bonding, at least a narrow metal ring can be formed around the circumference of each via section or electrical via, at least on one of the bonded surfaces.

After successful bonding, second release layer 82 is released, e.g. by mechanical debonding, laser debonding, or chemical debonding, in order to detach second carrier plate 78 from nozzle layer 4, see step D.

Advantageously, the first and second release layers 74, 82 are designed to be debonded using differing techniques such that it is possible to debond one of them without affecting the other one. Most preferably, the first release layer 74 is designed to be laser-debonded, and the second release layer is designed to be either mechanically or chemically debonded.

As mentioned, at least part of the feed ducts in feed layer 6 may be created using laser-induced etching.

In one embodiment, the via sections can be formed in this way before joining nozzle layer 4 and feed layer 6 (or part of feed layer 6).

In another embodiment, irradiation takes place before joining the layers 4, 6 while etching takes place after joining them. In this case, the method may comprise the following steps:

First, at least part of feed layer 6 (i.e. at least one of its sublayers, such as bottommost sublayer 6*a*) is irradiated at certain locations by laser light.

Now, nozzle layer 4 is joined to (or manufactured on) one side of this (optionally partial) sublayer 6*a*.

Finally, etching can be used for forming at least part of the feed ducts, e.g. the bottommost via sections 20*a* in sublayer 6*a* at locations where sublayer 6*a* has been irradiated before. Ducts can be formed at these locations in an anisotropic manner because the etching rate within the laser-irradiated regions is much faster than in regions not irradiated by the laser.

The width of the ducts can be adjusted by etching longer than the time required for only opening the laser-irradiated regions.

Suitable laser-induced etching techniques are known to the skilled person. For example, the techniques described by US2016059359 may be used.

If the ducts in a given sublayer are to be customized, the following techniques may e.g. be used:

Only the locations where ducts are to be formed are irradiated, and then all of the irradiated locations are etched.

All locations for potential ducts are irradiated. Then some of the locations are masked by applying an etch-stop layer on top of them. Then the non-masked locations are etched. Then the etch-stop layer may be removed. This process leaves the masked locations non-etched and has the advantage that the laser irradiation can be the same for all print heads and customization can take place at a later time by masking.

A masking layer, such as photoresist, may also be used to protect the glass from thinning during the etching process, on any side of the respective sublayer.

At least some of the sublayers of feed layer 6 may be of $SiO_2$ or glass. This material is particularly advantageous when using laser-induced etching for manufacturing the ducts in the sublayers.

Also, it allows irradiating the first and/or second release layer 74, 82 in order to release them. For this purpose, either the first or the second carrier wafer 72, 78 may be transparent to laser light, such that during the debonding process the respective release layer is accessible to the laser light.

At least one of the sublayers of feed layer 6 may be a structured permanent photoresist film, e.g. by structuring a dry photoresist film or a spin-coated photoresist film. The photoresist may e.g. be US8 or any other epoxy-based material.

In order words, a photoresist film is structured by irradiation and subsequent selective material removal.

In particular, one or several of the upper layers, in particular one or more of the interconnect layers 6*d*, 6*f* and/or the layer 6*e* forming the ink terminal(s) 21 may be one or more structured photoresist films.

Preferably, when bonding the nozzle layer 4 to the feed layer 6, the feed layer 6 only contains the bottommost layer 6*a*. In this way, metal can be deposited onto the top surface of the bottommost sublayer 6*a* of the feed layer 6, e.g. by sputtering, and by photolithographic techniques the metal can be patterned into horizontal electrical tracks. Furthermore, the metal may coat into the electrical vias and make them conductive. In addition, the electrical vias may be completely filled with metal by electroplating or printing may be used to fill the vias with metal, including printing by a print head of the invention. The same process may be repeated for each new sublayer of the feed layer 6.

In case the feed layer 6 already contains several sublayers when being bonded to the nozzle layer 4, the electrical vias and horizontal electrical tracks are preferably already formed.

To enable electrical contact between nozzle layer 4 and feed layer 6, where needed, bonding of such a multi-layer feed layer 6 to the nozzle layer 4 should not be made by an adhesive unless such adhesive has anisotropic conductive properties. Otherwise, bonding is advantageously made by fusion, anodic, eutectic or similar bonding techniques where metal layers of nozzle layer 4 and the feed layer 6 make direct contact with each other.

Figure 35:
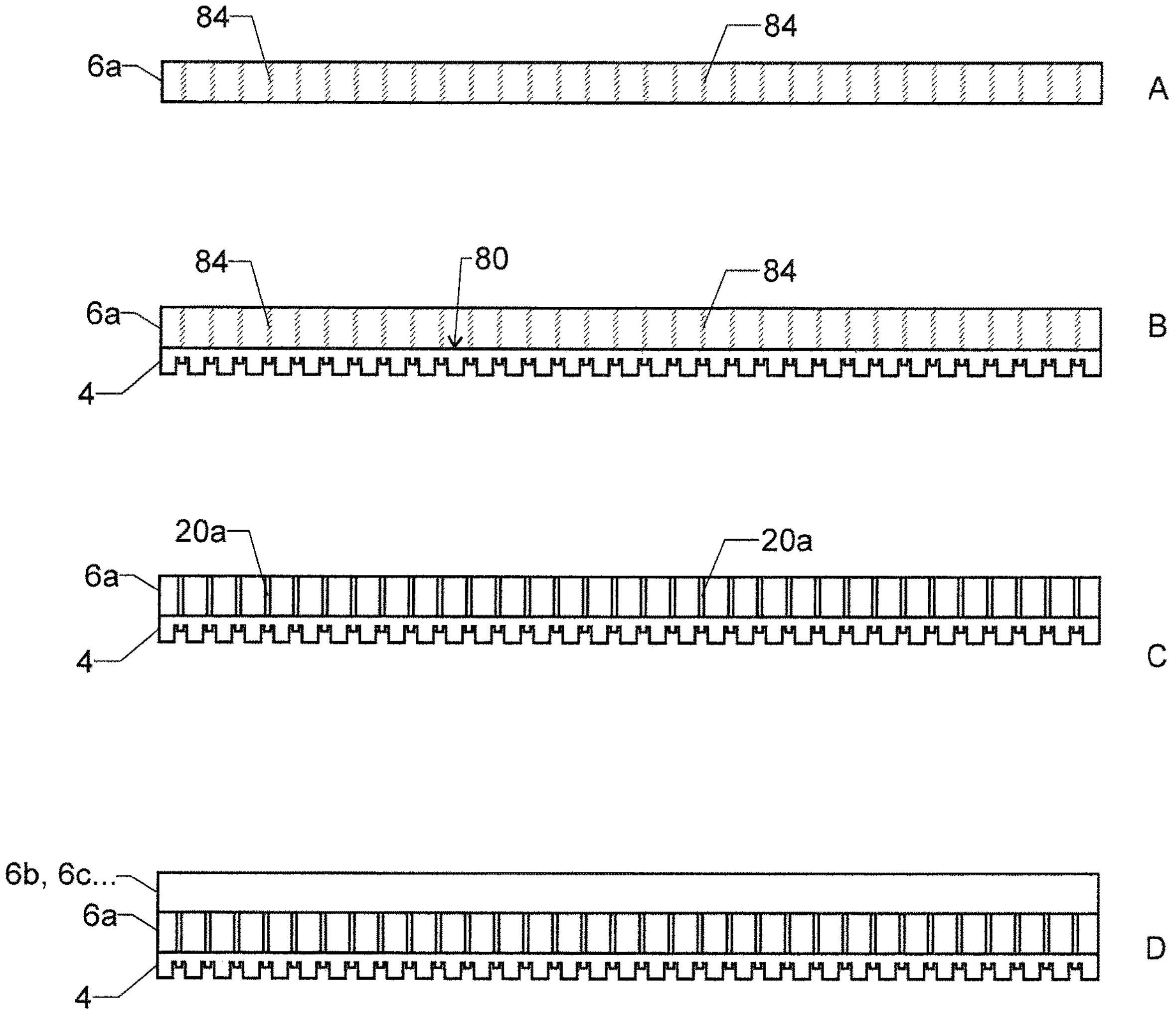
FIG. 35 illustrates a first embodiment of possible steps for manufacturing the print head.

FIG. 35 shows a second embodiment of a manufacturing process. It uses a laser etching technique as describes above and starts with sublayer 6*a*, which is first irradiated at locations 84 with laser light. The locations 84 correspond to the locations where, later, the via sections 20*a* are to be formed (Step A).

If sublayer 6*a* is of a sufficient thickness to support itself and the subsequent manufacturing steps, it may be used alone. Alternatively, it may be combined with a carrier plate and a release layer on top of it as described above.

In a next step, the structure of nozzle layer 4 can be directly built onto the bottom side of sublayer 6*a* by the application and structuring of its respective sublayers (Step B).

In a next step (or at least after applying the topmost sublayer of nozzle layer 4), sublayer 6*a* can be etched in order to etch off the layer-treated locations 84 in order to form the via sections 20*a* (Step C). (Masking can be used if not all of the laser-treated locations 84 are to be etched off).

For the etching to stop once it reaches an interface surface 80 at the top of the nozzle layer 4, surface 80 of the nozzle layer 4 should be made of a material that does not etch in the etchant used for opening the ducts. If hydrofluoric acid or similar chemistry is used for etching the ducts, the nozzle layer 4 at its interface surface 80 can be made of a metal or a largely etch-resistant dielectric such as Silicon Nitride or a combination of the two. Advantageously, the whole nozzle layer 4 is covered by a temporary masking material, e.g. photoresist, during the etching process.

Now, further sublayers 6*b*, 6*c* . . . of feed layer 6 can be applied to the top side of sublayer 6*a* using the techniques described above (Step D).

In other words, in the embodiment of FIG. 35, the method comprises the steps of

- irradiating locations 84 where via sections 20*a* are to be formed in a bottommost sublayer 6*a* of feed layer 6,
- applying at least one sublayer of nozzle layer 4 to the bottommost sublayer 6*a* of feed layer 6, and
- only then etching at least part of the locations 84.

To assist the alignment between the not yet completed via sections 20*a* and the structures of the nozzle layer 4, it is possible to selectively open some irradiated structures prior to the formation of the nozzle layer 4 and use those structures as markers. Selective opening of such structures can be achieved by masking all other structures, e.g. by photoresist, during etching.

Before forming the second sublayer 6*b* of the feed layer 6 on top of the first sublayer 6*a*, metal can be deposited into the via sections, e.g. by sputtering, and then the metal can be structured by photolithography in order to create horizontal electrical tracks. The metal may also remain within the electrical vias. Alternatively, or in addition, the electrical vias can be completely filled with metal by electroplating. This process can be repeated for each step.

In a particularly advantageous embodiment (applicable to both embodiments of FIG. 34 as well as 35), at least some of the conducting feed lines 26, 46, 50*a*, 50*b*, in particular at least some of the horizontal electrical tracks 50, 50*a*, 50*b*, are manufactured using a printing process, where the conductive material for the feed lines is deposited from a printing head above and below printed dielectric sublayers of the feed layer 6. This allows customizing the tracks easily. In particular, electrohydrodynamic printing can be used for this purpose.

The result of such a manufacturing approach is the wiring of extraction electrodes shown in FIG. 36. Here, electrical tracks 50 cross each other at the location of dielectric patches 51. According to this manufacturing method, first only the lower electrical tracks 50 are printed, i.e. those moving underneath the dielectric patches 51, followed by printing of the dielectric patches 51 at the crossing positions, followed by printing of the upper electrical tracks 50, i.e. the ones that move on top of the dielectric patches 51. In case a single electrical track 50 moves both, underneath and on top of a dielectric patch 51, such electrical track 50 can be printed from at least two sub-tracks. The at least two sub-tracks may consist of any part of the electrical track 50 that needs to be printed directly onto the substrate and all those parts which are printed on top of the dielectric patch 51, in which case the parts in contact with the substrate are printed first, and parts that are printed on top of dielectric patches 51 are printed only after printing of the dielectric patch 51.

Where two electrical tracks 50 of e.g. equal width cross at a 90° angle, dielectric patches 51 are advantageously formed with e.g. a circular shape, wherein the diameter of such circle or patch should be larger than the width of the electrical tracks 50 by at least a factor of the square root of two, but preferably by at least a factor of two. In cases where two electrical tracks 50 of unequal width cross each other, the diameter of a circular dielectric patch 51 is advantageously calculated on the basis of the width of the wider electrical track. The dielectric patch 51 may have a rounded topography, being thicker in its center than at the circumference, in order to make it easier to form intact electrical tracks 50 across it as well as making it easier to manufacture the dielectric patch 51 itself.

If two electrical tracks 50 cross each other at an angle that is not 90°, the cross-section between the crossing electrical tracks 50 will grow larger in area and, in particular, it may increase in direction of the bottom line. In such a situation, a circular dielectric patch 51 can be elongated in direction of the bottom electrical track 50 (not shown), i.e. it can be formed as a line having rounded endings. In certain situations, two electrical tracks may cross, at least over a limited length, parallel to each other, i.e. at an angle of 0°. Forming such crossings can be important in regions where the density of electrical tracks is high and where, along the width of such region, not all lines can fit.

Of course, it is also possible to perform the wiring of electrical tracks 50 at least partly by conventional methods know by those skilled in the art, e.g. by metal coating, photolithography-based patterning, dielectric layer formation (e.g. by photoresist), etc.

A suitable printing process is e.g. described in US 2018/0009223. It may also involve print heads manufactured according to this invention.

A suitable printing ink for printing electrically conducting feed lines is e.g. a silver nanoparticle ink, where silver nanoparticles are dispersed in a higher alkane, for example. After printing, the structure is tempered at 100° C. for 10 minutes in order to anneal the silver nanoparticles into conductive tracks.

In this embodiment, crossing, non-contacting feed lines may be formed at a single level by printing insulating patches at the locations where the feed lines intersect. To print the insulating patches, an ink with dispersed dielectric nanoparticles may be used, e.g. with dispersed SiO2 or Al2O3 particles. The ink may also be of polymeric nature and be cured with UV light, for example. Curing is best exercised directly after printing. The insulating patches may be further annealed together with the deposited conductive material of the conductive fee lines.

Most preferably, this method of manufacturing is used to redistribute the feed lines of extraction electrodes on the upper sublayers of the feed layer 6, e.g. after dicing of the wafer into print head dies. The same method may also be employed to create redistribution layers more generally, i.e. also in other applications in semiconductor packaging.

Notes

As can be seen from the embodiments shown herein, the bottommost sublayer 6*a* of feed layer 6 is advantageously a via layer and forms the bottommost via sections 20*a*. Each of these via sections 20*a* is advantageously connected to exactly one of the nozzles 8.

The diameter D of the via sections 20*a* in bottommost via layer 6*a* (see FIG. 1) should be smaller than the horizontal distance between neighboring nozzles 8. In particular, the diameter is advantageously smaller than 100 μm, in particular smaller than 50 μm. On the other hand, it should not be too small in order to reduce the risk of clogging, to simplify alignment of the layers, and/or to reduce flow resistance. Advantageously, the diameter D is therefore at least 10 μm.

Diameter D is advantageously also larger than the diameter of channel 18 of the nozzles 8 in order to avoid problems due to insufficient wetting.

The thickness T of the bottommost via layer 6*a* of feed layer 6 is advantageously not more than 500 μm, in particular no more than 100 μm in order to reduce flow resistance, the reduce risk of clogging, and/or ease manufacturing. On the other hand, it is advantageously at least 10 μm.

As mentioned, feed layer 6 consists at least in part of a dielectric material. Advantageously, it comprises a plurality of structured dielectric sublayers.

In the above embodiment, some of the sublayers are interconnect layers while others of the sublayers are via layers. It must be noted that a sublayer may be a via layer as well as a connect layer by comprising both via sections and interconnect sections.

It should be mentioned that this invention is not limited to the simple electrode designs illustrated in the drawings. Any further number of electrodes could be added to the nozzle layer and then guided through the feed layer towards the voltage terminals. In the present drawings, there are generally a maximum of one or two electrical vias formed for each nozzle in the lowest sublayer of the feed layer but this number may be increased as needed to accommodate all the necessary electrodes.

Advantageously, however, the maximum number of electrical vias formed for each nozzle is kept as low as possible because this allows for closer nozzle-to-nozzle arrangement.

To accommodate further electrodes, it is possible to interconnect common electrodes on the nozzle layer before funneling them through the lowest sublayer of the feed layer in the form of an electrical via. Generally, the only electrode that necessitates an own electrical via for each nozzle is the common extraction electrode. However, this requirement may be relaxed by the introduction of double-actuation extraction electrodes as introduced in WO 2016/169956 A1. In this case, individuality may be introduced by a row and a column signal, and hence, the first partial extraction electrodes of at least two nozzles situated along a given row may be interconnected and all the second partial extraction electrodes of at least two nozzles situated along a given column may be interconnected.

It must be noted that the path length of the ink in the feed ducts between the ink terminal(s) 21 and the nozzles 8 may vary from nozzle to nozzle. In order to still ensure that the same flow rates are maintained for all the (identical) nozzles 8, or for at least a majority of them, the flow resistance for ink between the ink terminal(s) 21 and the nozzles 8 should advantageously vary by less than 25%, in particular less than 5%, over (i.e. for) a majority of said nozzles 8.

This can e.g. be achieved by making the flow resistance of the via sections 20*a* much higher than the flow resistance of the interconnect sections 20*b*.

While there are shown and described presently preferred embodiments of the invention, it is to be distinctly understood that the invention is not limited thereto but may be otherwise variously embodied and practiced within the scope of the following claims.

The invention claimed is:

1. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material;

at least one first voltage terminal; and a plurality of conducting feed lines arranged in or on said feed layer, wherein said feed lines electrically connect said first voltage terminal(s) to at least part of said nozzle electrodes, and wherein only a subset of said nozzle electrodes is connected to at least one voltage terminal.

2. The print head of claim 1, wherein only a subset of said nozzles communicates via said feed ducts with the one or more ink terminals.

3. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material;

at least one first voltage terminal; and a plurality of conducting feed lines arranged in or on said feed layer, wherein said feed lines electrically connect said first voltage terminal(s) to at least part of said nozzle electrodes, wherein at least part of said feed lines comprises electrical vias extending through at least part of said feed layer, and wherein said printing head comprises at least one electrical via for each of a majority of said nozzles.

4. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material;

at least one first voltage terminal; and a plurality of conducting feed lines arranged in or on said feed layer, wherein said feed lines electrically connect said first voltage terminal(s) to at least part of said nozzle electrodes, wherein at least part of said feed lines comprises horizontal electrical tracks arranged in or on said feed layer, and wherein said feed lines comprise several sets of horizontal electrical tracks separated by at least one dielectric layer.

5. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material;

at least one first voltage terminal; and a plurality of conducting feed lines arranged in or on said feed layer, wherein said feed lines electrically connect said first voltage terminal(s) to at least part of said nozzle electrodes, wherein said print head comprises a plurality of area fractions, with each area fraction comprising the same number and arrangements of nozzles, wherein the nozzle electrodes of all nozzles contained within each single area fraction are connected to separate voltage terminals of the print head, and wherein the nozzle electrodes of all nozzles in any given coordinate of all the area fractions are connected to the same voltage terminal.

6. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material;

cavities extending at least through part of the print head; and electrical vias extending through at least part of said cavities, wherein said cavities are vent ducts extending through said feed layer and said nozzle layer.

7. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material; and vent ducts extending through said feed layer and said nozzle layer.

8. The print head of claim 7, wherein said nozzle layer comprises a two-dimensional, regular array of said nozzles.

9. The print head of claim 7, wherein said feed ducts comprise at least one of:

via sections extending transversally through at least part of said feed layer or at least one interconnect section extending along said feed layer, wherein said feed layer comprises at least one interconnect layer having at least one opening forming at last part of said interconnect sections.

10. The print head of claim 9, further comprising via sections and interconnect sections, wherein each interconnect section is connected to several via sections, and wherein at least some of said interconnect sections are not connected to each other.

11. The print head of claim 9, wherein said feed layer comprises at least one via layer, with at least part of said via sections being formed in said via layer, wherein each via section in a bottommost via layer is connected to exactly one of said nozzles, and wherein a thickness of said via layer is less than 500 μm.

12. The print head of claim 11, wherein a diameter of said via sections in a bottommost via layer, is at least one of:

less than 100 μm, or at least 10 μm, or larger than a diameter of a channel extending through said nozzles, or less than a thickness of said via layer.

13. The print head of claim 9, further comprising at least a first and a second set of interconnect sections, wherein the interconnect sections of the first set extend parallel to each other, the interconnect sections of the second set extend parallel to each other, and the interconnect sections of the first set extend transversally to the interconnect sections of the second set, and wherein the interconnect sections of the first and the second set are interconnected by via sections.

14. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material; and wherein said feed ducts comprise at least one of:

via sections extending transversally through at least part of said feed layer and/or at least one interconnect section extending along said feed layer, wherein said feed layer comprises at least one interconnect layer having at least one opening forming at last part of said interconnect sections, wherein said feed layer comprises at least two sublayers, and wherein a number of via sections in a lower one of the sublayers is larger than in a higher one of the sublayers.

15. The print head of claim 14, wherein said feed layer comprises at least one of:

at least one sublayer consisting of at least one of $SiO_2$ and/or glass, or at least one sublayer that is a structured photoresist film.

16. The print head of claim 14, wherein at least a bottommost sublayer of said feed layer is transparent for at least one wavelength smaller than 800 nm.

17. The print head of claim 14, wherein said nozzle layer only comprises dielectric layers.

18. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material, wherein a majority or of all of said nozzles, comprises a reference electrode positioned to contact ink in said nozzle, and wherein the reference electrodes are arranged at a top side of said nozzle layer and/or at a bottom side of said feed ducts, and wherein the print head further comprises electric vias extending through at least part of said feed layer and connected to said reference electrodes.

19. The print head of claim 18, further comprising electrically conductive horizontal tracks interconnecting at least some of said reference electrodes, and in particular wherein said horizontal tracks are arranged in a common plane with said reference electrodes.

20. The print head of claim 18, further comprising a shielding electrode arranged at a level below said nozzle electrodes, and in particular wherein said shielding electrode is a continuous conducting layer surrounding a plurality of nozzles with openings at locations below said nozzles.

21. The print head of claim 19, wherein said feed layer comprises a plurality of sublayers and wherein said nozzle layer has smaller horizontal extension than at least part of the sublayers of said feed layer.

22. The print head of claim 19, wherein a flow resistance for ink between said ink terminal and said nozzles varies by less than 25% over a majority of said nozzles.

23. An electrohydrodynamic print head comprising:

a nozzle layer comprising a plurality of nozzles and nozzle electrodes;

a feed layer comprising a plurality of feed ducts extending through said feed layer and connecting at least part of said nozzles to one or more ink terminals of said print head, wherein said feed layer is, at least in part, of a dielectric material; and bridges extending across at least some of the feed ducts at locations where a diameter of the feed ducts increases along an up-down direction, wherein said bridges extend across vertical via sections at locations where the via sections intersect with horizontal interconnect sections.

24. A method for manufacturing a print head that includes a nozzle layer having a plurality of nozzles and nozzle electrodes and a feed layer having a plurality of feed ducts extending through said feed layer and connecting at least part of said nozzles to one or more ink terminals of said print head, wherein said feed layer is, at least in part, of a dielectric material, the method comprising:

manufacturing said nozzle layer with said nozzles;

manufacturing said feed layer;

forming said feed ducts in said feed layer;

preparing the nozzle layer on a first carrier plate with a first release layer between a first surface of said nozzle layer and said first carrier plate;

applying a second carrier plate to a second side of the nozzle layer with a second release layer between the second carrier plate and the nozzle layer;

releasing said first release layer;

applying at least part of said feed layer to said first side of said nozzle layer; and releasing said second release layer.

25. The method of claim 24, further comprising applying or manufacturing said nozzle layer to/on one side at least part of the feed layer.

26. The method of claim 24, further comprising opening said feed ducts through said feed layer after applying or manufacturing said nozzle layer.

27. A method for manufacturing a print head that includes a nozzle layer having a plurality of nozzles and nozzle electrodes and a feed layer having a plurality of feed ducts extending through said feed layer and connecting at least part of said nozzles to one or more ink terminals of said print head, wherein said feed layer is, at least in part, of a dielectric material, the method comprising:

manufacturing said nozzle layer with said nozzles;

manufacturing said feed layer;

forming said feed ducts in said feed layer;

forming at least part of the feed ducts in said feed layer by laser-induced etching;

first laser-irradiating at least a sublayer of the feed layer, then joining or manufacturing the nozzle layer to/on one side of the irradiated feed layer, then etching the irradiated feed layer for forming at least part of the feed ducts at irradiated locations of said sublayer.

28. The method of claim 27, further comprising, for forming the feed ducts in a sublayer of said feed layer, one of:

irradiating only locations where ducts are to be formed and then etching all of the irradiated locations, or irradiating all locations where ducts might be formed, masking some of said locations, and etching the non-masked potential locations.

29. The method of claim 27, further comprising:

irradiating locations where ducts are to be formed in a bottommost sublayer of the feed layer, applying at least one sublayer of the nozzle layer to the bottommost sublayer of the feed layer, and only then etching at least part of the locations.

30. A method for manufacturing a print head that includes a nozzle layer having a plurality of nozzles and nozzle electrodes and a feed layer having a plurality of feed ducts extending through said feed layer and connecting at least part of said nozzles to one or more ink terminals of said print head, wherein said feed layer is, at least in part, of a dielectric material, the method comprising:

manufacturing said nozzle layer with said nozzles;

manufacturing said feed layer;

forming said feed ducts in said feed layer, wherein said print head comprises a plurality of conducting feed lines in or on said feed layer, and wherein said method comprises printing at least some of the conducting feed lines including at least some horizontal electrical tracks.

* * * * *